(12) United States Patent
Reining

(10) Patent No.: US 11,526,645 B2
(45) Date of Patent: Dec. 13, 2022

(54) METHOD AND ELECTRONIC CIRCUIT FOR IMPROVING A DRIVING FORCE FUNCTION OF AN ELECTRODYNAMIC ACOUSTIC TRANSDUCER

(71) Applicant: Sound Solutions International Co., Ltd., Beijing (CN)

(72) Inventor: Friedrich Reining, Vienna (AT)

(73) Assignee: Sound Solutions International Co., Ltd., Beijing (CN)

( * ) Notice: Subject to any disclaimer, the term of this patent is extended or adjusted under 35 U.S.C. 154(b) by 297 days.

(21) Appl. No.: 16/856,016

(22) Filed: Apr. 22, 2020

(65) Prior Publication Data

US 2020/0342154 A1 Oct. 29, 2020

(30) Foreign Application Priority Data

Apr. 23, 2019 (AT) .............................. A 50365/2019

(51) Int. Cl.
*H04R 3/00* (2006.01)
*G06F 30/367* (2020.01)
(Continued)

(52) U.S. Cl.
CPC .............. *G06F 30/367* (2020.01); *H04R 1/24* (2013.01); *H04R 3/08* (2013.01); *H04R 9/025* (2013.01);
(Continued)

(58) Field of Classification Search
CPC . H04R 1/24; H04R 3/08; H04R 9/025; H04R 9/18
(Continued)

(56) References Cited

U.S. PATENT DOCUMENTS 9,980,068 B2 * 5/2018 Berthelsen ........... H04R 29/001
10,542,361 B1 * 1/2020 Lazar ..................... H04R 3/007
(Continued)

FOREIGN PATENT DOCUMENTS

CN 103763659 A 4/2014
CN 105530586 A 4/2016
(Continued)

OTHER PUBLICATIONS

First Office Action for counterpart Austrian patent application No. A50365/2019, dated Sep. 9, 2019.
(Continued)

*Primary Examiner* — Katherine A Faley
(74) *Attorney, Agent, or Firm* — Dykema Gossett PLLC

(57) ABSTRACT

Method and electronic circuit for determining a scaling factor k for a driving force function of a model of an electrodynamic acoustic transducer having at least two voice coils. Input signal fed into the transducer and it's model cause electromotive forces. A shift for the driving force function is determined on the base of the ratios between the real electromotive forces and the modeled electromotive forces. Finally, the scaling factor k is determined on the basis of a deviation between the real electromotive forces and the modeled electromotive forces at time points where the real electromotive forces and the modeled electromotive forces each are equal. The invention moreover relates to an electronic circuit for performing the above steps, and to a transducer system with the electronic circuit and a connected transducer.

27 Claims, 4 Drawing Sheets

(51) Int. Cl.
*H04R 3/08* (2006.01)
*H04R 9/04* (2006.01)
*H04R 9/18* (2006.01)
*H04R 9/02* (2006.01)
*H04R 1/24* (2006.01)
*G06F 111/10* (2020.01)
*G06F 119/14* (2020.01)

(52) U.S. Cl.
CPC ............... *H04R 9/04* (2013.01); *H04R 9/18* (2013.01); *G06F 2111/10* (2020.01); *G06F 2119/14* (2020.01)

(58) Field of Classification Search
USPC ........................................ 381/401, 396, 117
See application file for complete search history.

(56) References Cited

U.S. PATENT DOCUMENTS

| | | | |
|---|---|---|---|
| 2009/0028371 A1* | 1/2009 | Bailey | H04R 9/025 381/386 |
| 2014/0321690 A1 | 10/2014 | Reining | |
| 2018/0139552 A1 | 5/2018 | Cao et al. | |
| 2018/0279051 A1 | 9/2018 | Reining | |
| 2018/0279052 A1 | 9/2018 | Reining | |

FOREIGN PATENT DOCUMENTS

| | | |
|---|---|---|
| CN | 107222812 A | 9/2017 |
| CN | 109495820 A | 3/2019 |
| DE | 102010010102 A1 | 9/2011 |
| WO | 2007/103937 A2 | 9/2007 |

OTHER PUBLICATIONS

First Office Action and Search Report issued in counterpart Chinese patent application No. 202010326101.3, dated Apr. 16, 2021.

* cited by examiner

METHOD AND ELECTRONIC CIRCUIT FOR IMPROVING A DRIVING FORCE FUNCTION OF AN ELECTRODYNAMIC ACOUSTIC TRANSDUCER

PRIORITY

This patent application claims priority from Austrian Patent Application No. A50365/2019, filed on Apr. 23, 2019, the disclosure of which is incorporated herein, in its entirety, by reference.

BACKGROUND a. Technical Field

The invention relates to a method for improving a driving force function dependent on a membrane excursion of a model of an electrodynamic acoustic transducer. The electrodynamic acoustic transducer comprises a membrane, a coil arrangement with at least two coils attached to the membrane, a magnet system being designed to generate a magnetic field transverse to a longitudinal direction of a wound wire of the coil arrangement and input terminals for receiving an input signal. Moreover, the invention relates to an electronic circuit, comprising a model of an electrodynamic acoustic transducer, in which the above method for improving the driving force function is executed. Finally, the invention relates to a transducer system, comprising an electrodynamic acoustic transducer of the above kind and an electronic circuit of the above kind connected thereto.

b. Background Art

Modern (smart) amplifiers, which are used for driving electrodynamic acoustic transducers, often comprise a model of the electrodynamic acoustic transducer, which allows to obtain parameters like the actual excursion of the membrane, an amplitude of the membrane, an electromotive force and the like based on an input signal. Usually, the behavior of the electrodynamic acoustic transducer is modeled by use of an electric circuit diagram, in which both the electrical and the mechanical behavior of the electrodynamic acoustic transducer is considered. For example, the electrodynamic acoustic transducer can be modeled in SPICE, which is a popular simulator for electric circuit diagrams.

One of the parameters used in the model is the driving force function $BL(x)$. Usually, a number of (real) electrodynamic acoustic transducers are used to determine a mean or best fit driving force function $BL(x)$, which in turn is used for computations using the model of the electrodynamic acoustic transducer. It is in the nature of a mean or best fit driving force function $BL(x)$ that it does not necessarily correspond to the actual driving force function $BL(x)$ of a particular electrodynamic acoustic transducer. Malfunction of the electrodynamic acoustic transducer, distortion of the output sound and even damage of the electrodynamic acoustic transducer can be the consequence.

SUMMARY OF THE INVENTION

Thus, it is an object of the invention to overcome the drawbacks of the prior art and to provide a better method for improving a driving force function, a better electronic circuit for improving a driving force function and a better transducer system. In particular, the object of the invention is to find out the individual driving force function $BL(x)$ of a particular electrodynamic acoustic transducer so that the model in an electronic circuit or amplifier driving this electrodynamic acoustic transducer corresponds to reality as much as possible.

The inventive problem is solved by a method of determining a scaling factor for a modeled driving force function dependent on a membrane excursion of a model of an electrodynamic acoustic transducer having at least two voice coils, comprising the steps of:

a) applying a first input signal to at least one of the voice coils of the real electrodynamic acoustic transducer and applying a second input signal to (at least one of the voice coils of) the model of the electrodynamic acoustic transducer, which model is based on said modeled driving force function, b) calculating a graph of a first electromotive force for a first voice coil of the voice coils and a second electromotive force for a second voice coil of the voice coils of the real electrodynamic acoustic transducer and calculating a graph of a first electromotive force for a first voice coil of the voice coils and a second electromotive force for a second voice coil of the voice coils of the model of the electrodynamic acoustic transducer, c) shifting the modeled driving force function by modification of the excursion argument until a deviation between the ratio between the first electromotive force and the second electromotive force of the real electrodynamic acoustic transducer and the ratio between the first electromotive force and the second electromotive force of the model of the electrodynamic acoustic transducer is below a predetermined threshold, d) finding/selecting a first time point where the first electromotive force substantially equals the second electromotive force of the real electrodynamic acoustic transducer and finding/selecting a second time point where the first electromotive force substantially equals the second electromotive force of the model of the electrodynamic acoustic transducer with the shifted modeled driving force function, e) determining the scaling factor for the shifted modeled driving force function by use of a deviation of the electromotive forces originating from the real electrodynamic acoustic transducer at said first time point or in a time span including said first time point from the electromotive forces originating from the model of the electrodynamic acoustic transducer at said second time point or in a time span including said second time point and f) updating the modeled driving force function by multiplying the modeled driving force function with the scaling factor.

Furthermore, the inventive problem is solved by an electronic circuit, which comprises a model of an electrodynamic acoustic transducer having at least two voice coils, which is connectable to input terminals of the electrodynamic acoustic transducer and which is designed to perform the aforementioned steps a) to f.

Finally, the inventive problem is solved by a transducer system, which comprises:

an electrodynamic acoustic transducer with a membrane, a coil arrangement with at least two voice coils attached to the membrane, a magnet system being designed to generate a magnetic field transverse to a longitudinal direction of a wound wire of the coil arrangement, and input terminals for receiving an input signal, and an electronic circuit of the above kind connected to the input terminals of the electrodynamic acoustic transducer.

By the proposed measures, the individual driving force function BL(x) of a particular electrodynamic acoustic transducer may be found so that the model in an electronic circuit or amplifier driving this electrodynamic acoustic transducer corresponds to reality as much as possible. Accordingly, the performance of the electrodynamic acoustic transducer may be improved in general. For example, distortions of the audio output of the transducer can be reduced in this way. In other words, sonic waves emanating from the transducer nearly perfectly fit to the electric sound signal being applied to the transducer.

As noted above, the electrodynamic acoustic transducer can be modeled by an electric circuit diagram in SPICE, which is a popular simulator for electric circuit diagrams for example. Alternatively, parameters of the electrodynamic acoustic transducer may be computed and stored in a lookup table for later use. Such a lookup table links an input signal of the electrodynamic acoustic transducer to an associated membrane excursion or an associated membrane velocity for example.

It should be noted that the above steps do not necessarily imply a particular sequence of the steps a) to f), and the steps a) to f) or sub steps may be done in a different order. Moreover, single steps a) to f), a group of steps a) to f) or all steps a) to f) may be executed iteratively or recursively, i.e. more than one time.

It should be noted that generally the input signal can be applied to one of the voice coils of the coil arrangement or to both the first coil and the second coil. In the latter case, the input signal is applied just to an outer tap of the serially connected voice coils.

"Substantially" in this disclosure particularly means a deviation of ±10% from a reference value.

The "driving force function" or "BL(x)-function" links the force generated by a certain current through the coil to the membrane excursion x and may be measured as it is generally known in prior art. It should be noted that although the presented method is disclosed in the context of a driving force function, which links the force generated by a certain current through the coil to the membrane excursion, the technical disclosure equally applies to driving functions, which link the magnetic field generated by a certain current through the coil to the membrane excursion. So, the term "driving force functions" also means comparable driving functions throughout the disclosure.

The "magnetic zero position" is the crossing point of the driving force functions for the first coil and the driving force function for the second coil of the electrodynamic acoustic transducer, that means the point where both driving force functions intersect. At said magnetic zero position or said crossing point the driving force functions for the first coil and the driving force function for the second coil are equal (i.e. a ratio between said values is substantially 1, respectively a difference between said values is substantially 0 then). In particular, the conjunction area between the voice coil in this case is held in a position, in which both coils are pervaded by the same magnetic flux given the fact that both coils have the same number of windings.

The "idle position or zero position of the membrane" marks the position of the membrane where its excursion is zero. It should be noted that the idle position or zero position of the membrane usually does not coincide with the magnetic zero position.

An "electromotive force" denotes a voltage of an electrical voltage source. In the context of the invention, the electromotive force is the voltage induced in the coil by a movement of the same. Despite its name, the term does not describe a force in the physical sense, but an electrical voltage.

"Applying a second input signal to the model of the electrodynamic acoustic transducer in particular means "applying a second input signal to at least one of the voice coils of the model of the electrodynamic acoustic transducer". The voice coils may explicitly exist in the model of the electrodynamic acoustic transducer, or their behavior can be modeled without their explicit existence in the model of the electrodynamic acoustic transducer. However, even in this case, "applying a second input signal to the model of the electrodynamic acoustic transducer" causes a reaction or result which is similar to a reaction or result caused by a first input signal fed to the coils of the real electrodynamic acoustic transducer.

"Shifting the modeled driving force function" and "Using the shifted modeled driving force function" in particular means that the argument x of the BL(x)-function is altered before the result of the BL(x)-function is determined. In detail, the shift of the modeled driving force function determined in step c) can be subtracted from the argument x before the result of the BL(x)-function is determined. So, indeed BL(x-shift) is determined then, wherein the shift is the difference between the offset of the modeled BL(x)-function from the real BL(x)-function.

It should be noted that the electronic circuit may comprise an amplifier driving the electrodynamic acoustic transducer, but it is also possible to denote such an electronic circuit as an amplifier, which is capable of performing the method steps a) to f).

The proposed method applies to speakers in general and particularly to micro speakers, whose membrane area is smaller than 600 mm$^2$ and/or whose back volume is in a range from 200 mm$^3$ to 2 cm$^3$. Such micro speakers are used in all kind of mobile devices such as mobile phones, mobile music devices, laptops and/or in headphones. It should be noted at this point, that a micro speaker does not necessarily comprise its own back volume but can use a space of a device, which the speaker is built into, as a back volume. That means the speaker does not comprise its own (closed) housing but just an (open) frame. The back volume of the devices, which such speakers are built into, typically is smaller than 10 cm$^3$.

Further details and advantages of the audio transducer of the disclosed kind will become apparent in the following description and the accompanying drawings.

Beneficially, the first input signal and/or the second input signal is a sine signal with constant magnitude in step a). This type of input signal is particularly simple.

Beneficially, the first input signal and/or the second input signal can also be a sine signal with a varying magnitude wherein the magnitude particularly changes linearly or in steps or sample by sample over time in step a). In particular, the first input signal and/or the second input signal shall comprise a magnitude causing the membrane to excurse until or even beyond the magnetic zero position. In other words, the membrane excursion shall equal or even exceed the offset of said magnetic zero position from a zero or idle position of the membrane. It should be noted that the magnitude change should be sufficiently slow to avoid deterioration of the proposed method caused by transient effects. Furthermore, step c) beneficially is executed at the same or at least comparable membrane excursions in the real electrodynamic acoustic transducer and its model.

Beneficially, the first input signal and/or the second input signal can also be a noise signal in step a), in particular a spectrally shaped noise signal. In this way, multiple spectral effects can be taken into consideration in a single step.

Advantageously, the first input signal and/or the second input signal has only frequency components above 0.95 times the resonant frequency of the electrodynamic acoustic transducer. In this way, the compliance of the membrane does not much influence the result of the presented method in this range.

Advantageously, the first input signal and/or the second input signal can also have only frequency components below 0.95 times the resonant frequency of the electrodynamic acoustic transducer. In this way, the proposed method of determining a scaling factor k for a modeled driving force function can be performed inaudible or almost inaudible, in particular if a frequency in the range of 100 Hz is used for the input signals.

In a very advantageous embodiment of the proposed method, a frequency of the first input signal and/or a frequency of the second input signal substantially equals the resonant frequency of the electrodynamic acoustic transducer. When using an input signal at the resonant frequency of the electrodynamic acoustic transducer, the excursion of the membrane is high compared to the power of the input signal. That is why the electrodynamic acoustic transducer does not heat up much causing just a small drift of the parameters of the electrodynamic acoustic transducer. High membrane excursion also means high amplitudes for the electromotive forces (and thus a high signal to noise ratio, "SNR" for short). Moreover, the movement of the membrane is (almost) a sinusoidal curve.

It is also advantageous if the first input signal and the second input signal have the same frequency or frequency components. In this way, the effects caused by the first input signal in the real electrodynamic acoustic transducer and the effects caused by the second input signal in the modeled electrodynamic acoustic transducer are very similar.

Furthermore, it is advantageous if the first input signal and the second input signal are identical. In this way, the effects caused by the first input signal in the real electrodynamic acoustic transducer and the effects caused by the second input signal in the modeled electrodynamic acoustic transducer are very similar, too, and ideally identical.

Beneficially, the electromotive force $U_{emf1}$ of the first coil and the electromotive force $U_{emf2}$ of the second coil can be calculated by the formulas:

$$U_{emf1} = U_{in1} - Z_{C1} \cdot I_{in}$$

$$U_{emf2} = U_{in2} - Z_{C2} \cdot I_{in}$$

wherein $Z_{C1}$ is the (instantaneous) coil resistance of the first coil, $U_{in1}$ is the input voltage to the first coil and $I_{in}$ is the input current to the first coil. Accordingly, $Z_{C2}$ is the (instantaneous) coil resistance of the second coil, $U_{in2}$ is the input voltage to the second coil and $I_{in}$ is the input current to the second coil. It should be noted that the first and the second coil are switched in series so that the current $I_{in}(t)$ is the same for both coils.

Furthermore, it should be noted that $Z_{C1}$ and $Z_{C2}$ are complex numbers in the above formulas. However, for a simplified calculation also the (real valued and instantaneous) coil resistances of the first coil and the second coil $R_{DC1}$ and $R_{DC2}$ may be used instead of the complex values $Z_{C1}$ and $Z_{C2}$, thus neglecting capacitive/inductive components of the coil resistance. Accordingly, "$Z_{C1}$" may be changed to "$R_{DC1}$", "$Z_{C2}$" may be changed to "$R_{DC2}$" and "$Z_C$" may be changed to "$R_{DC}$" in this disclosure.

Accordingly, it is also of advantage if the electromotive force $U_{emf1}$ of the first coil and the electromotive force $U_{emf2}$ of the second coil are calculated by the formulas:

$$U_{emf1} = U_{in1} - R_{DC1} \cdot I_{in}$$

$$U_{emf2} = U_{in2} - R_{DC2} \cdot I_{in}$$

in step b) wherein $R_{DC1}$ is the (real valued) coil resistance of the first coil, $U_{in1}$ is the input voltage to the first coil and $I_{in}$ is the input current to the first coil. Accordingly, $R_{DC2}$ is the (real valued) coil resistance of the second coil, $U_{in2}$ is the input voltage to the second coil and $I_{in}$ is the input current to the second coil. It should be noted that the first coil and the second coil are switched in series so that the current $I_{in}$ is the same for both coils. This embodiment is particularly useful to calculate the electromotive forces $U_{emf1}$ of the first coil and the electromotive force $U_{emf2}$ of the real electrodynamic acoustic transducer.

It is particularly useful in the above context, if the frequency of the first input signal and/or a frequency of the second input signal substantially equals the resonant frequency of the electrodynamic acoustic transducer. It appears from the aforementioned formulas that determining the real value of the coil resistances $R_{DC1}$ and $R_{DC2}$ is needed for determining the electromotive forces $U_{emf1}$, $U_{emf2}$. Due to losses in the electrodynamic acoustic transducer while applying an electrical signal, the coil resistances $R_{DC1}$ and $R_{DC2}$ change over time. That is why commonly an ongoing measurement of the coil resistances $R_{DC1}$ and $R_{DC2}$ is required, for example by means of a (low frequency) pilot tone. However, by use of input signals at the resonant frequency of the electrodynamic acoustic transducer, the (real valued) coil resistances $R_{DC1}$ and $R_{DC2}$ can initially be measured using any state-of-the-art method without the need of an ongoing application of a pilot signal. Moreover, if a point in time is searched, at which the electromotive forces $U_{emf1}$, $U_{emf2}$ caused by an input signal at the resonant frequency are equal, the initial values of the coil resistances $R_{DC1}$ and $R_{DC2}$ are sufficient if substantially equal heating in both coils is assumed. For the sake of completeness, it should be noted that the advantages already mentioned hereinbefore apply, too. That are low heat up and a small drift of the parameters of the electrodynamic acoustic transducer, high amplitudes for the electromotive forces (and thus a SNR) and an (almost) sinusoidal movement of the membrane.

Furthermore, it is of advantage if the electromotive force $U_{emf1}'$ of the first modeled coil and the electromotive force $U_{emf2}'$ of the second modeled coil are calculated by the formulas:

$$x(t) = A \cdot \sin(\omega t)$$

$$v(t) = A \cdot \omega \cdot \cos(\omega t)$$

$$U_{emf1,2}' = BL(x(t)) \cdot A \cdot \omega \cdot \cos(\omega t)$$

$$U_{emf1,2}' = BL(A \cdot \sin(\omega t)) \cdot A \cdot \omega \cdot \cos(\omega t)$$

wherein $x(t)$ is the actual excursion of the modeled membrane, A is the amplitude of the modeled membrane, $\omega$ is the frequency of the second input signal, t is the time and $v(t)$ is the actual velocity of the modeled membrane. This embodiment is particularly useful to calculate the electromotive forces $U_{emf1}'$ of the first coil and the electromotive force $U_{emf2}'$ of the model of the electrodynamic acoustic transducer. However, if the model of the electrodynamic acoustic transducer is able to output the electromotive forces $U_{emf1}'$, $U_{emf2}'$, the (explicit) use of the above formulas may be omitted.

Beneficially, a shift for the modeled driving force function being dependent on the membrane excursion is determined by use of a root mean square value of the electromotive forces $U_{emf1}$, $U_{emf2}$ originating from the real electrodynamic acoustic transducer and of a root mean square value of the electromotive forces $U_{emf1}'$, $U_{emf2}'$ originating from the model of the electrodynamic acoustic transducer in step c). In this way, determination of the shift for the driving force function $BL(x)$ is comparably easy and also precise because the computation is not based on single values of the electromotive forces $U_{emf1}$, $U_{emf2}$, $U_{emf1}'$, $U_{emf2}'$, but on a series of values. In particular, the averaging is done for full periods of the input signal.

Advantageously, a shift for the modeled driving force function being dependent on the membrane excursion can also be determined by use of a rectified and low pass filtered graph of the electromotive forces $U_{emf1}$, $U_{emf2}$ originating from the real electrodynamic acoustic transducer and of a rectified and low pass filtered graph of the electromotive forces $U_{emf1}'$, $U_{emf2}'$ originating from the model of the electrodynamic acoustic transducer in step c). This is an alternative method to obtain values comparable to the root mean square values of the electromotive forces $U_{emf1}$, $U_{emf2}$, $U_{emf1}'$, $U_{emf2}'$. Again, determination of the shift for the driving force function $BL(x)$ is comparably easy and also precise because the computation is not based on single values of the electromotive forces $U_{emf1}$, $U_{emf2}$, $U_{emf1}'$, $U_{emf2}'$. In particular, filtering is done for full periods of the input signal.

Beneficially, a cut off frequency of a low pass used for low pass filtering the graph of the electromotive forces $U_{emf1}$, $U_{emf2}$ originating from the real electrodynamic acoustic transducer and the graph of the electromotive forces $U_{emf1}'$, $U_{emf2}'$ originating from the model of the electrodynamic acoustic transducer is below the lower cutoff frequency of the frequency range of the electrodynamic acoustic transducer and particularly <20 Hz. In this way, the averaging effect is comparably strong in the region of the resonant frequency of the electrodynamic acoustic transducer or beyond the resonant frequency of the electrodynamic acoustic transducer.

In a very advantageous embodiment, the modeled driving force function is shifted by a shift until a ratio between the root mean square value of the first electromotive force $U_{emf1}$ or the rectified low pass filtered first electromotive force $U_{emf1}$ and the root mean square value of the second electromotive force $U_{emf2}$ or the rectified low pass filtered second electromotive force $U_{emf2}$ originating from the real electrodynamic acoustic transducer substantially equals said ratio for the electromotive forces $U_{emf1}'$, $U_{emf2}'$ originating from the model of the electrodynamic acoustic transducer in step c). In this way, the shift of the driving force function $BL(x)$ can be determined by using simply the root mean square values of the electromotive forces $U_{emf1}$, $U_{emf2}$, $U_{emf1}'$, $U_{emf2}'$ or by using the rectified low pass filtered electromotive forces $U_{emf1}$, $U_{emf2}$, $U_{emf1}'$, $U_{emf2}'$. When both ratios are equal, the driving force functions $BL(x)$ for the first coil and the driving force function $BL(x)$ for the second coil for both the real electrodynamic acoustic transducer and the model thereof intersect at the same x-position, i.e. at the same offset from the zero position of the membrane. It should be noted, that the above variant equally applies to parameters, which can be derived from the root mean square value. In particular, instead of the root mean square value, the square value of the electromotive forces $U_{emf1}$, $U_{emf2}$, $U_{emf1}'$, $U_{emf2}'$ can be used in the above context. It should also be noted that the rectified low pass filtered electromotive forces $U_{emf1}$, $U_{emf2}$, $U_{emf1}'$, $U_{emf2}'$ are comparable to the averaged absolute values of the electromotive forces $U_{emf1}$, $U_{emf2}$, $U_{emf1}'$, $U_{emf2}'$. Furthermore, other mathematical operations may be applied to both the numerator and the denominator of the above ratios without changing the ratio.

Beneficially, a graph of a difference $\Delta U_{emf}$ of the first electromotive force $U_{emf1}$ and the second electromotive force $U_{emf2}$ for the real electrodynamic acoustic transducer is calculated (that means $\Delta U_{emf} = U_{emf1} - U_{emf2}$) and the first time point is selected in the graph of said difference $\Delta U_{emf}$ where said difference $\Delta U_{emf}$ is substantially zero, and a graph of a difference $\Delta U_{emf}'$ of the first electromotive force $U_{emf1}'$ and the second electromotive force $U_{emf2}'$ for the model of the electrodynamic acoustic transducer with the shifted modeled driving force function is calculated (that means $\Delta U_{emf}' = U_{emf1}' - U_{emf2}'$) and the second time point is selected in the graph of said difference $\Delta U_{emf}'$ where said difference $\Delta U_{emf}'$ is substantially zero in step d). In other words, time points are searched/selected where $\Delta U_{emf} = U_{emf1} - U_{emf2} = 0$ and $\Delta U_{emf}' = U_{emf1}' - U_{emf2}' = 0$. That means, the first electromotive force $U_{emf1}$ and the second electromotive force $U_{emf2}$ for the real electrodynamic acoustic transducer are equal in the first time point, and the first electromotive force $U_{emf1}'$ and the second electromotive force $U_{emf2}'$ for the model of the electrodynamic acoustic transducer are equal in the second time point. At or around the first time point, two subsequent samples in the graph $\Delta U_{emf} = U_{emf1} - U_{emf2}$ have different signs, and at or around the second time point, two subsequent samples in the graph $\Delta U_{emf}' = U_{emf1}' - U_{emf2}'$ have different signs.

Moreover, it is advantageous if a graph of a difference $\Delta U_{emf}$ of the first electromotive force $U_{emf1}$ and the second electromotive force $U_{emf2}$ for the real electrodynamic acoustic transducer is calculated and the first time point is selected in the graph of said difference $\Delta U_{emf}$ where an absolute value of the gradient $d\Delta U_{emf}/dt$ of said graph of said difference $\Delta U_{emf}$ becomes minimal, and a graph of a difference $\Delta U_{emf}'$ of the first electromotive force $U_{emf1}'$ and the second electromotive force $U_{emf2}'$ for the model of the electrodynamic acoustic transducer with the shifted modeled driving force function is calculated and the second time point is selected in the graph of said difference $\Delta U_{emf}'$ where an absolute value of the gradient $d\Delta U_{emf}'/dt$ of said graph of said difference $\Delta U_{emf}'$ becomes minimal in step d). In other words, time points are searched/selected where the absolute values of the gradients reach their minimum in the graphs $\Delta U_{emf} = U_{emf1} - U_{emf2}$ and $\Delta U_{emf}' = U_{emf1}' - U_{emf2}'$. At or around these time points, the differences of two subsequent samples in the graphs $\Delta U_{emf} = U_{emf1} - U_{emf2}$ and $\Delta U_{emf}' = U_{emf1}' - U_{emf2}'$ reach their minimum. Further on, the graphs $\Delta U_{emf} = U_{emf1} - U_{emf2}$ and $\Delta U_{emf}' = U_{emf1}' - U_{emf2}'$ should be zero or close to zero. In these time points, the first input signal and the second input signal have a level causing the real membrane and the model membrane to reach their maximum excursions.

It is very advantageous if a graph of a difference $\Delta U_{emf}$ of the first electromotive force $U_{emf1}$ and the second electromotive force $U_{emf2}$ for the real electrodynamic acoustic transducer is calculated and the first time point is selected in the graph of said difference $\Delta U_{emf}$ where a gradient $d\Delta U_{emf}/dt$ of said graph of said difference $\Delta U_{emf}$ is substantially zero, and a graph of a difference $\Delta U_{emf}'$ of the first electromotive force $U_{emf1}'$ and the second electromotive force $U_{emf2}'$ for the model of the electrodynamic acoustic transducer with the shifted modeled driving force function is calculated and the second time point is selected in the graph of said difference $\Delta U_{emf}'$ where a gradient $d\Delta U_{emf}'/dt$ of said graph of said difference $\Delta U_{emf}'$ is substantially zero in step d). In other words, time points are searched/selected where the gradient=0 in the graph $\Delta U_{emf}=U_{emf1}-U_{emf2}$ and $\Delta U_{emf}'=U_{emf1}'-U_{emf2}'$. At or around these time points, two subsequent samples in the graphs $\Delta U_{emf}=U_{emf1}-U_{emf2}$ and $\Delta U_{emf}'=U_{emf1}'-U_{emf2}'$ are substantially equal and should be zero or close to zero. In these time points, the first input signal and the second input signal have a level causing the real membrane and the model membrane to excurse until the magnetic zero position of the driving force functions BL(x) for the first coil and the second coil of the real or modeled electrodynamic acoustic transducer. In other words, the membrane excursion equals the offset of said magnetic zero position from a zero or idle position of the membrane, and one of the reversal points of the membrane is located exactly at the magnetic zero positions. This embodiment marks the threshold between the ranges where the graphs $\Delta U_{emf}=U_{emf1}-U_{emf2}$ and $\Delta U_{emf}'=U_{emf1}'-U_{emf2}'$ each comprise two zero crossings per period of the input signal and where the graphs $\Delta U_{emf}=U_{emf1}-U_{emf2}$ and $\Delta U_{emf}'=U_{emf1}'-U_{emf2}'$ each comprise four zero crossings per period of the input signal.

In a further beneficial variant of the proposed method, a graph of a difference $\Delta U_{emf}$ of the first electromotive force $U_{emf1}$ and the second electromotive force $U_{emf2}$ for the real electrodynamic acoustic transducer is calculated and the first time point is selected in the graph of said difference $\Delta U_{emf}$ where an absolute value of the gradient $d\Delta U_{emf}/dt$ of said graph of said difference $\Delta U_{emf}$ is positive, and a graph of a difference $\Delta U_{emf}'$ of the first electromotive force $U_{emf1}'$ and the second electromotive force $U_{emf2}'$ for the model of the electrodynamic acoustic transducer with the shifted modeled driving force function is calculated and the second time point is selected in the graph of said difference $\Delta U_{emf}'$ where an absolute value of the gradient $d\Delta U_{emf}'/dt$ of said graph of said difference $\Delta U_{emf}'$ is positive in step d).

In other words, time points are searched/selected where the gradient>0 or <0 in the graphs $\Delta U_{emf}=U_{emf1}-U_{emf2}$ and $\Delta U_{emf}'=U_{emf1}'-U_{emf2}'$. In this range, the input signals have a level causing the real membrane and the modeled membrane to excurse beyond the magnetic zero position of the real or the modeled electrodynamic acoustic transducer. In other words, the membrane excursion exceeds the offset of said magnetic zero position from the zero or idle position of the membrane, and the reversal point of the membrane is located beyond the magnetic zero position. In this embodiment, the graphs $\Delta U_{emf}=U_{emf1}-U_{emf2}$ and $\Delta U_{emf}'=U_{emf1}'-U_{emf2}'$ each comprise four zero crossings per period of the input signal. Advantageously, a deviation between the graphs of the electromotive forces $U_{emf1}, U_{emf2}$ of the real electrodynamic acoustic transducer and the electromotive forces $U_{emf1}', U_{emf2}'$ of the model of the electrodynamic acoustic transducer is very high because of the high velocity of the membrane. In turn, also a very good signal to noise ratio (SNR) is obtained. That is why a scaling factor k can precisely be determined in this embodiment.

In yet another very advantageous variant of the proposed method, a graph of a difference $\Delta U_{emf}$ of the first electromotive force $U_{emf1}$ and the second electromotive force $U_{emf2}$ for the real electrodynamic acoustic transducer is calculated and the first time point is selected in the graph of said difference $\Delta U_{emf}$ where two outer zero crossings of three zero crossings are within a half period of the first input signal, and a graph of a difference $\Delta U_{emf}'$ of the first electromotive force $U_{emf1}'$ and the second electromotive force $U_{emf2}'$ for the model of the electrodynamic acoustic transducer with the shifted modeled driving force function is calculated and the second time point is selected in the graph of said difference $\Delta U_{emf}'$ where two outer zero crossings of three zero crossings are within a half period of the second input signal in step d). This is an alternative method for handling the case that the membrane excursion exceeds the offset of the magnetic zero position from the zero or idle position of the membrane, the reversal point of the membrane is located beyond the magnetic zero position, and the graphs $\Delta U_{emf}=U_{emf1}-U_{emf2}$ and $\Delta U_{emf}'=U_{emf1}'-U_{emf2}'$ each comprise four zero crossings per period of the input signal. The advantages noted for the embodiment before equally apply to this embodiment.

Generally it is of advantage, if in step e) the scaling factor k for the modeled driving force function is set to the ratio between the maximum of the first or second electromotive force $U_{emf1}, U_{emf2}$ or their maximum sum originating from the real electrodynamic acoustic transducer in a period of the first input signal, which includes the first time point found in step d), and the first or second electromotive force $U_{emf1}', U_{emf2}'$ or their maximum sum originating from the model of the electrodynamic acoustic transducer in a period of the second input signal, which includes the second time point found in step d). In this embodiment, single values of the electromotive forces are used. That is why the calculation of the scaling factor k is comparably simple. In particular, the ratio between the sum of the electromotive forces $U_{emf1}, U_{emf2}$ originating from the real electrodynamic acoustic transducer and the sum of the electromotive forces $U_{emf1}', U_{emf2}'$ originating from the model of the electrodynamic acoustic transducer is used to compute the scaling factor k.

Yet it is also advantageous if the scaling factor k for the modeled driving force function is set to a value, for which a difference between the graph of the first or second electromotive force $U_{emf1}, U_{emf2}$ or of their sum originating from the real electrodynamic acoustic transducer during a time span of at least one time period of the first input signal including said first time point found in step d) and the graph of the first or second electromotive force $U_{emf1}', U_{emf2}'$ or of their sum originating from the model of the electrodynamic acoustic transducer during a time span of at least one time period of the second input signal including said second time point found in step d) is below a predetermined threshold based on the least mean square algorithm in step e). Beneficially, the scaling factor k can be computed more precisely because the calculation is not based on single values of the electromotive forces, but on their graphs. In particular, the calculation is based on the graph of the sum of the electromotive forces $U_{emf1}, U_{emf2}$ originating from the real electrodynamic acoustic transducer and on the graph of the sum of the electromotive forces $U_{emf1}', U_{emf2}'$ originating from the model of the electrodynamic acoustic transducer.

In a very advantageous embodiment of the proposed method:
  the first input signal and the second input signal are sine signals with a varying magnitude in step a),
  a frequency of the first input signal and a frequency of the second input signal substantially equals the resonant frequency of the electrodynamic acoustic transducer,
  the electromotive force $U_{emf1}$ of the first coil and the electromotive force $U_{emf2}$ of the second coil are calculated by the formulas:

$$U_{emf1} = U_{in1} - R_{DC1} \cdot I_{in}$$

$$U_{emf2} = U_{in2} - R_{DC2} \cdot I_{in}$$

in step b) wherein $R_{DC1}$ is the (real valued) coil resistance of the first coil, $U_{in1}$ is the input voltage to the first coil and $I_{in}$ is the input current to the first coil, and wherein $R_{DC2}$ is the (real valued) coil resistance of the second coil, $U_{in2}$ is the input voltage to the second coil and $I_{in}$ is the input current to the second coil, the modeled driving force function is shifted by the shift until a ratio between the root mean square value of the first electromotive force $U_{emf1}$ or the rectified low pass filtered first electromotive force $U_{emf1}$ and the root mean square value of the second electromotive force $U_{emf2}$ or the rectified low pass filtered second electromotive force $U_{emf2}$ originating from the real electrodynamic acoustic transducer substantially equals said ratio for the electromotive forces $U_{emf1}'$, $U_{emf2}'$ originating from the model of the electrodynamic acoustic transducer in step c), a graph of a difference $\Delta U_{emf}$ of the first electromotive force $U_{emf1}$ and the second electromotive force $U_{emf2}$ for the real electrodynamic acoustic transducer ($\Delta U_{emf} = U_{emf1} - U_{emf2}$) is calculated and the first time point is selected in the graph of said difference $\Delta U_{emf}$ where a gradient of said graph of said difference $\Delta U_{emf}$ is substantially zero, and a graph of a difference $\Delta U_{emf}'$ of the first electromotive force $U_{emf1}'$ and the second electromotive force $U_{emf2}'$ for the model of the electrodynamic acoustic transducer is calculated ($\Delta U_{emf}' = U_{emf1}' - U_{emf2}'$) and the second time point is selected in the graph of said difference $\Delta U_{emf}'$ where a gradient of said graph of said difference $\Delta U_{emf}'$ is substantially zero in step d) and the modeled driving force function is set to a value, for which a difference between the graph of the first or second electromotive force $U_{emf1}$, $U_{emf2}$ or of their sum originating from the real electrodynamic acoustic transducer during a time span of at least one time period of the first input signal including said first time point and the graph of the first or second electromotive force $U_{emf1}'$, $U_{emf2}'$ or of their sum originating from the model of the electrodynamic acoustic transducer during a time span of at least one time period of the second input signal including said second time point is below a predetermined threshold based on the least mean square algorithm in step e).

In detail, a first input signal is applied to the real electrodynamic acoustic transducer and a second input signal is applied to the model electrodynamic acoustic transducer which ensure that the excursion of the membrane reaches or even exceeds the magnetic zero position of the real/modeled electrodynamic acoustic transducer. Beneficially, the first input signal and the second input signal are identical sinus signals at the resonant frequency of the electrodynamic acoustic transducer. In a second step, the absolute values of the graphs for the electromotive forces $U_{emf1}$, $U_{emf2}$ are averaged or low pass filtered, and the driving force function of the model of the electrodynamic acoustic transducer is shifted until the aforementioned ratios $U_{emf1}/U_{emf2}$ and $U_{emf1}'/U_{emf2}'$ are equal (note that the graph $\Delta U_{emf} = U_{emf1} - U_{emf2}$ is not averaged or low pass filtered for this calculation in this embodiment). In a further step, graphs for the electromotive forces $U_{emf1}$, $U_{emf2}$ and $\Delta U_{emf} = U_{emf1} - U_{emf2}$ are calculated for the real electrodynamic acoustic transducer, and graphs for the electromotive forces $U_{emf1}'$, $U_{emf2}'$ and $\Delta U_{emf}' = U_{emf1}' - U_{emf2}'$ are calculated for the updated modeled electrodynamic acoustic transducer with the shifted driving force function. Next, time points are searched in the graphs of said difference $\Delta U_{emf}$ and $\Delta U_{emf}'$ where the gradients of said graphs are substantially zero in step d). At these time points, the membrane excursion equals the offset of the magnetic zero position from the membrane's zero or idle position. In other words, one of the reversal points of the membrane is located exactly at the magnetic zero position. Moreover, the excursion of the membrane of the real electrodynamic acoustic transducer at said first time point and the excursion of the membrane of the modeled electrodynamic acoustic transducer at said second time point are equal. Finally, the scaling factor k for the driving force function can be set to the ratio between the electromotive forces $U_{emf1} + U_{emf2}$ in said first time point found in step d) originating from the real electrodynamic acoustic transducer and the electromotive forces $U_{emf1}' + U_{emf2}'$ in said second time point found in step d) originating from the shifted model of the electrodynamic acoustic transducer in step e).

In yet another very advantageous embodiment of the proposed method:

the first input signal applied to at least one of the voice coils in step a) is a sine signal with constant magnitude, the second input signal in step a) is a sine signal with a varying magnitude, a frequency of the first input signal and a frequency of the second input signal substantially equals the resonant frequency of the electrodynamic acoustic transducer, the electromotive force $U_{emf1}$ of the first coil and the electromotive force $U_{emf2}$ of the second coil are calculated by the formulas $$U_{emf1} = U_{in1} - R_{DC1} \cdot I_{in}$$

$$U_{emf2} = U_{in2} - R_{DC2} \cdot I_{in}$$

in step b) wherein $R_{DC1}$ is the (real valued) coil resistance of the first coil, $U_{in1}$ is the input voltage to the first coil and $I_{in}$ is the input current to the first coil, and wherein $R_{DC2}$ is the (real valued) coil resistance of the second coil, $U_{in2}$ is the input voltage to the second coil and $I_{in}$ is the input current to the second coil, the modeled driving force function is shifted by the shift until a ratio between the root mean square value of the first electromotive force $U_{emf1}$ or the rectified low pass filtered first electromotive force $U_{emf1}$ and the root mean square value of the second electromotive force $U_{emf2}$ or the rectified low pass filtered second electromotive force $U_{emf2}$ originating from the real electrodynamic acoustic transducer substantially equals said ratio for the electromotive forces $U_{emf1}'$, $U_{emf2}'$ originating from the model of the electrodynamic acoustic transducer in step c), a graph of a difference $\Delta U_{emf}$ of the first electromotive force $U_{emf1}$ and the second electromotive force $U_{emf2}$ for the real electrodynamic acoustic transducer is calculated ($\Delta U_{emf} = U_{emf1} - U_{emf2}$) and the first time point is selected in the graph of said difference $\Delta U_{emf}$ where two outer zero crossings of three zero crossings are within a half period of the first input signal, and graph of a difference $\Delta U_{emf}'$ of the first electromotive force $U_{emf1}'$ and the second electromotive force $U_{emf2}'$ for the model of the electrodynamic acoustic transducer is calculated ($\Delta U_{emf}' = U_{emf1}' - U_{emf2}'$) and the second time point is selected in the graph of said difference $\Delta U_{emf}'$ where two outer zero crossings of three zero crossings are within a half period of the second input signal in step d) and the modeled driving force function is set to a value, for which a difference between the graph of the first or second electromotive force $U_{emf1}$, $U_{emf2}$ or of their sum originating from the real electrodynamic acoustic transducer during a time span of at least one time period of the first input signal including said first time point and the graph of the first or second electromotive force $U_{emf1}'$, $U_{emf2}'$ or of their sum originating from the model of the electrodynamic acoustic transducer during a time span of at least one time period of the second input signal including said second time point is below a predetermined threshold based on the least mean square algorithm in step e).

In this embodiment, the excursion of the membrane exceeds the magnetic zero position of the electrodynamic acoustic transducer. Furthermore, the graphs $\Delta U_{emf}$ and $\Delta U_{emf}'$ each comprise four zero crossings per period of the input signals in this embodiment. Accordingly, time points are searched where two outer zero crossings of three zero crossings are within a half period of the first input signal and/or the second input signal. The time or phase shift between the two outer zero crossings shall be equal in the real electrodynamic acoustic transducer and in the model of the electrodynamic acoustic transducer. Alternatively, time points may be searched in the graphs $\Delta U_{emf} = U_{emf1} - U_{emf2}$ and $\Delta U_{emf}' = U_{emf1}' - U_{emf2}'$ where absolute values of their gradients become minimal in step d).

The first input signal and the second input signal are different in this embodiment. The first input signal fed into the real electrodynamic acoustic transducer is a sine signal with constant magnitude, whereas the second input signal fed into the model of the electrodynamic acoustic transducer is a sine signal with a varying magnitude, wherein the magnitude particularly changes linearly or in steps or sample by sample over time.

In particular it should also be taken care of that step c) is executed at the same or at least comparable membrane excursions in the real electrodynamic acoustic transducer and its model. Step c) may also recursively repeated. In particular, a new shifted driving force function may be used in each iteration.

A distinct amplitude of the membrane excursion can be determined by the triple of zero crossings of the graph $\Delta U_{emf}$ of the real electrodynamic acoustic transducer in the region of the reversal point of the membrane given a certain time delay between the outer zero crossings. At the outer zero crossings, the membrane excursion corresponds to the offset of the magnetic zero position from the membrane's zero or idle position. In a next step, a sine function is searched, which has the frequency of the input signal and runs through the aforementioned membrane excursions (i.e. through the offset of the magnetic zero position at the outer zero crossings of the graph $\Delta U_{emf}$). The maximum of this sine function corresponds to the amplitude of the membrane movement. Subsequently, the second time point is searched in the graph of the excursion of the membrane where the amplitude of the model's membrane corresponds to the above amplitude.

Alternatively, the second time point can be searched in the graph of the difference $\Delta U_{emf}'$ of the transducer's model where the time difference or the phase angle of the outer zero crossings of the three zero crossings corresponds to the time difference or the phase angle of the outer zero crossings of the three zero crossings in the graph of the difference $\Delta U_{emf}$ of the real electrodynamic acoustic transducer at the first time point. Finally, the scaling factor k for the driving force function again can be set to the ratio between the electromotive forces $U_{emf1} + U_{emf2}$ in said first time point found in step d) originating from the real electrodynamic acoustic transducer and the electromotive forces $U_{emf1}' + U_{emf2}'$ in said second time point found in step d) originating from the model of the electrodynamic acoustic transducer in step e).

Beneficially, steps a) to f) are executed in a state, in which the electrodynamic acoustic transducer is built into a target device. In this way, the method of determining scaling factor for a driving force function of a model of an electrodynamic acoustic transducer can be executed in the environment, in which the electrodynamic acoustic transducer is finally used. In particular, the method can be repeated from time to time to consider aging of the electrodynamic acoustic transducer. A target device for example can be a mobile phone, ear phones, a laptop or any other device using this electrodynamic acoustic transducer.

Beneficially, a connection point between two voice coils is electrically connected to an input of the electronic circuit. Particularly, the electrical connection to outer taps of the coil arrangement and the electrical connection to the connection point between two voice coils are the only electrical connections between the electronic circuit and the coil arrangement in the above case. The connection point between two voice coils moreover may be connected just to an input of the electronic circuit. In this way, wiring between the electronic circuit and the electrodynamic transducer is comparably easy in view of the function of the transducer system.

It should be noted at this point that the various embodiments for the method and the advantages related thereto equally apply to the disclosed electronic circuit and the transducer system and vice versa.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

DETAILED DESCRIPTION OF EMBODIMENTS

Figure 1:
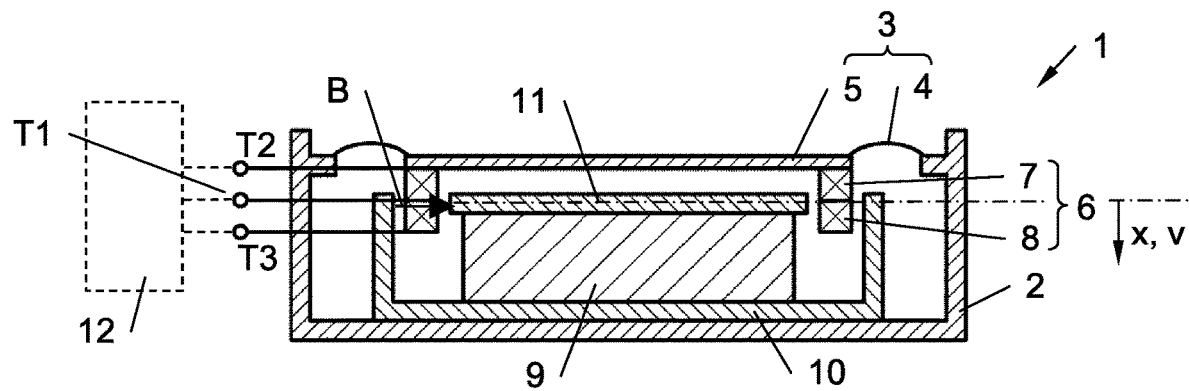
FIG. 1 shows a cross sectional view of an exemplary transducer.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus", "minus", "upper", "lower", "upward", "downward", "left", "right", "leftward", "rightward", "front", "rear", "top", "bottom", "over", "under", "above", "below", "vertical", "horizontal"," clockwise", and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached", "coupled", "connected", and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially", which particularly means a deviation of ±10% from a reference value.

FIG. 1 shows an example of an electrodynamic acoustic transducer 1, which may be embodied as a loudspeaker, in cross sectional view. The transducer 1 comprises a housing 2 and a membrane 3 having a bending section 4 and a center section 5, which is stiffened by a plate in this example. Furthermore, the transducer 1 comprises a coil arrangement 6 attached to the membrane 3. The coil arrangement 6 comprises a first coil 7 and a second coil 8. The first coil 7 is arranged on top of the second coil 8 and concentric to the second coil 8 in this example. Furthermore, the transducer 1 comprises a magnet system with a magnet 9, a pot plate 10 and a top plate 11. The magnet system generates a magnetic field B transverse to a longitudinal direction of a wound wire of the coil arrangement 6.

Additionally, the electrodynamic acoustic transducer 1 comprises three connection terminals T1 . . . T3 electrically connected to the coils 7, 8 and connected to an electronic circuit 12, which inter alia is capable of determining a scaling factor k for a modeled driving force function of a model of the electrodynamic acoustic transducer 1. The electrodynamic acoustic transducer 1 and the electronic circuit 12 together form a transducer system.

The excursion of the membrane 3 is denoted with "x" in the example shown in FIG. 1, its velocity with "v". As known, a current through the coil arrangement 6 causes a movement of the membrane 3 and thus sound, which emanates from the transducer 1.

Generally, the transducer 1 respectively the membrane 3 may have any shape in a top view, in particular a rectangular, circular or ovular shape. Furthermore, the coils 7 and 8 may have the same height or different heights, the same diameter or different diameters as well as the same number of winding or different numbers of windings.

It should be noted that the embodiment of the transducer 1 depicted in FIG. 1 shall not be used to limit the scope of the proposed method, and other embodiments of a transducer 1 may be used as well in the context of the proposed method.

Figure 2:
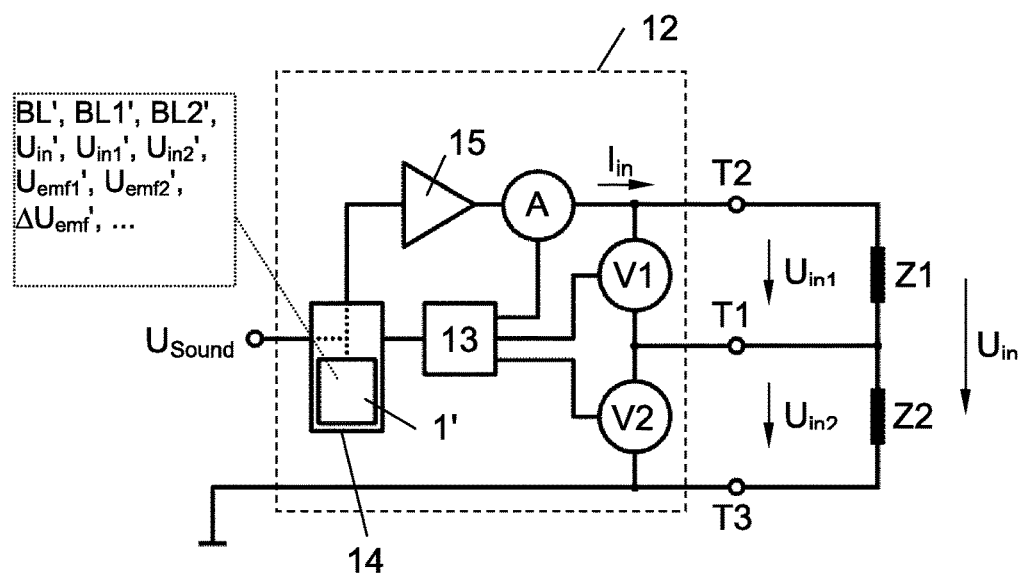
FIG. 2 shows a simplified circuit diagram of an electronic circuit connected to the transducer shown in FIG. 1.

FIG. 2 shows a circuit diagram of the transducer system, particularly of the electronic circuit 12 connected to the coil arrangement 6, which is shown by the impedances Z1 and Z2 in FIG. 2. The electronic circuit 12, comprises a measuring circuit 13, a processing circuit 14 and a power amplifier 15. Further on, the transducer system of FIG. 2 comprises a current measuring device A, and a first voltage measuring device V1 and a second voltage measuring device V2.

The measuring circuit 13 is connected to the current measuring device A, the first voltage measuring device V1 and the second voltage measuring device V2. The current measuring device A measures the input current $I_{in}$ to the first coil 7 and the second coil 8, the first voltage measuring device V1 measures the input voltage $U_{in1}$ to the first coil 7, and the second voltage measuring device V2 measures the input voltage $U_{in2}$ to the second coil 8. $U_{in}$ denotes the (total) input voltage over the first coil 7 and the second coil 8. Basically, the measuring circuit 13 is designed to preprocess the signals received from the current measuring device A, the first voltage measuring device V1 and the second voltage measuring device V2 and to pass the result to the processing circuit 14.

The processing circuit 14 receives an electric sound signal $U_{Sound}$, which may be received from a music player, a telephone module or the like for example. The electric sound signal $U_{Sound}$ is passed to the power amplifier 15, which amplifies the electric sound signal $U_{Sound}$ up to a level, which is suitable to output audible sound by the electrodynamic acoustic transducer 1. Yet, the electric sound signal $U_{Sound}$ is also fed into a model 1' of the electrodynamic acoustic transducer 1, which is stored and executed in the processing circuit 14.

Such a model 1' of the electrodynamic acoustic transducer 1 for example allows to obtain parameters like the excursion x of the membrane 3, the velocity v of the membrane 3, an amplitude of the membrane 3, an electromotive force and the like based on an input signal (here the sound signal $U_{Sound}$). Usually, the behavior of the electrodynamic acoustic transducer 1 is modeled by use of an electric circuit diagram, in which both the electrical and the mechanical behavior of the electrodynamic acoustic transducer 1 is considered. Alternatively, parameters of the electrodynamic acoustic transducer 1 may be computed and stored in a lookup table for later use. Such a lookup table links an input signal $U_{Sound}$ of the electrodynamic acoustic transducer 1 to an associated membrane excursion x or an associated membrane velocity v for example. So, the model 1' in the processing circuit 14 may also be formed by such a lookup table.

Just to illustrate the parameters, which can be used in the model 1', the total driving force function BL' of the modeled coils, the driving force function BL1' of the modeled first coil, the driving force function BL2' of the modeled second coil, the input signal $U_{in1}$' at the first coil of the modeled transducer, the input signal $U_{in2}$' at the second coil of the modeled transducer, the input signal $U_{in}$' to both coils of the modeled transducer, the electromotive force $U_{emf1}$' of the first coil of the modeled transducer, the electromotive force $U_{emf2}$' of the second coil of the modeled transducer and the difference of the electromotive forces $\Delta U_{emf}$' between the first coil and the second coil of modeled transducer are shown in a detailed view of the model 1'. Of course, the model 1' may contain other or further parameters.

Figure 3:
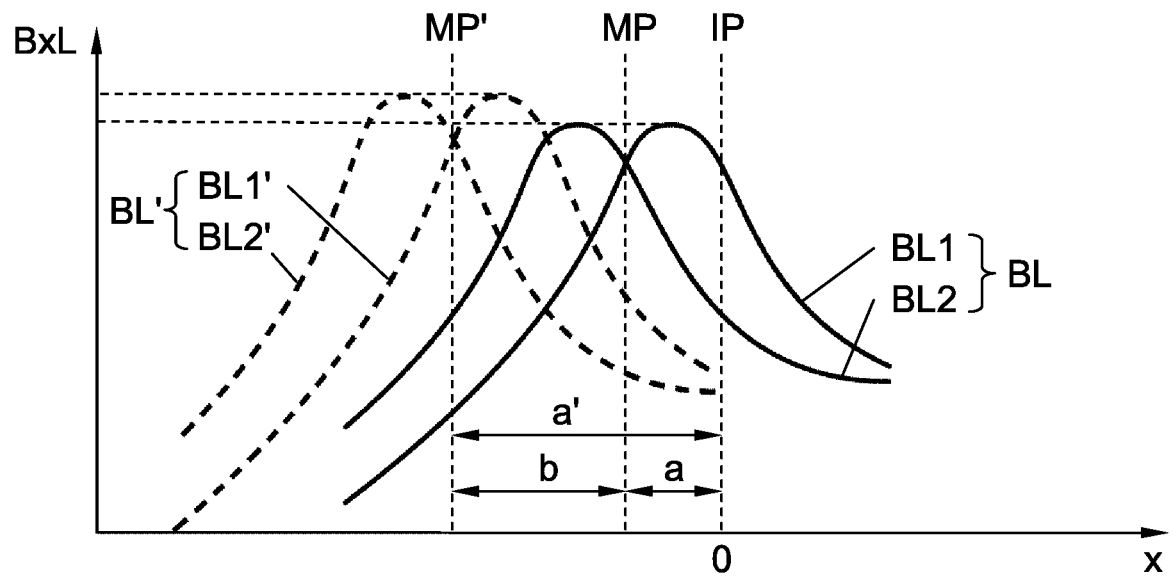
FIG. 3 shows exemplary graphs of the driving force factors of the first and the second coil of the transducer shown in FIG. 1 and its model.

As noted, one of the parameters used in the model 1' is the driving force function, which links the force generated by a certain current through the coil 7, 8 to the membrane excursion x and which may be measured as it is generally known in prior art (basically, the force acting on the membrane 3 is measured over the input current $I_{in}$). FIG. 3 shows the driving force function BL1 for the first coil 7 and the driving force function BL2 for the second coil 8 of the real electrodynamic acoustic transducer 1 in continuous lines, and the driving force function BL1' for the first coil and the driving force function BL2' for the second coil of the model 1' of the electrodynamic acoustic transducer 1 is shown in broken lines. Furthermore, the magnetic zero position MP of the real electrodynamic acoustic transducer 1 and the magnetic zero position MP' of the model 1' of the electrodynamic acoustic transducer 1 are shown.

The magnetic zero position MP of the real electrodynamic acoustic transducer 1 is the crossing point of the driving force functions BL1 for the first coil 7 and the driving force function BL2 for the second coil 8 of the real electrodynamic acoustic transducer 1, that means the point where both driving force functions BL1, BL2 intersect. At said magnetic zero position MP or said crossing point the driving force functions BL1 for the first coil 7 and the driving force function BL2 for the second coil 8 of the real electrodynamic acoustic transducer 1 are equal.

The magnetic zero position MP' of the model 1' of the electrodynamic acoustic transducer 1 is the crossing point of the driving force functions BL1' for the first coil and the driving force function BL2' for the second coil of the model 1' of the electrodynamic acoustic transducer 1, that means the point where both driving force functions BL1', BL2' intersect. At said magnetic zero position MP' or said crossing point the driving force functions BL1' for the first coil 7 and the driving force function BL2' for the second coil 8 of the model 1' of the electrodynamic acoustic transducer 1 are equal.

Moreover, the idle or zero position IP of the (real) membrane 3 is depicted in FIG. 3. The idle position IP marks the membrane's position x=0.

The magnetic zero position MP of the real electrodynamic acoustic transducer 1 and the idle position IP of the membrane 3 are displaced from one another by the offset a, and the magnetic zero position MP' of the model 1' of the electrodynamic acoustic transducer 1 and the idle position IP of the membrane 3 are displaced from one another by the offset a'.

FIG. 3 clearly shows that the driving force functions BL1 and BL2 of the real electrodynamic acoustic transducer 1 are different from the driving force function BL1' and BL2' of the model 1' of the electrodynamic acoustic transducer 1. The magnetic zero position MP of the real electrodynamic acoustic transducer 1 and the magnetic zero position MP' of the model 1' of the electrodynamic acoustic transducer 1 are displaced from one another by a shift b, and moreover, the driving force functions BL1 and BL1 of the real electrodynamic acoustic transducer 1 are lower than the driving force functions BL1' and BL2' of the model 1' of the electrodynamic acoustic transducer 1. It is easily understandable that the model 1' outputs parameter values which deviate from the corresponding parameter values of the real electrodynamic acoustic transducer 1 if the calculation is based on the driving force function BL1' and BL2'.

Figure 4:
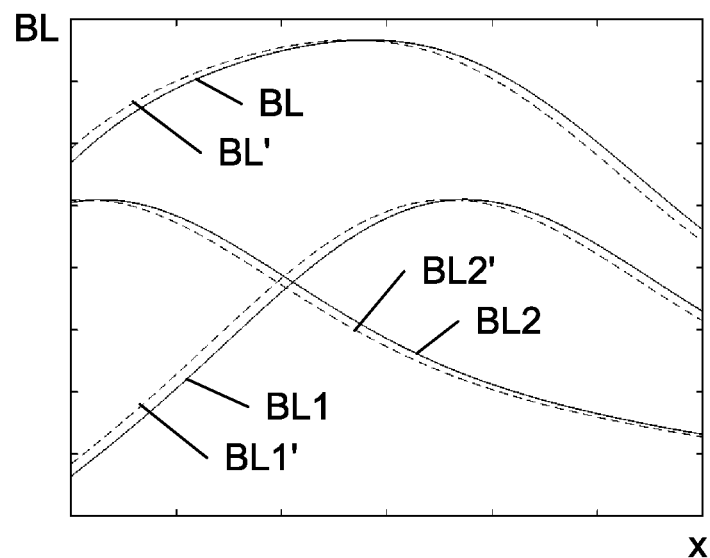
FIG. 4 shows further exemplary graphs of the driving force factors of the transducer shown in FIG. 1 and its model.

Additionally, FIG. 4 shows driving force functions BL, BL1, BL2, BL', BL1' and BL1' of another electrodynamic acoustic transducer 1. The driving force function BL1, the driving force function BL2 as well as the driving force function BL, which is the sum of the of the driving force functions BL1+BL2 of the real electrodynamic acoustic transducer 1 are shown in continuous lines, and the driving force function BL1', the driving force function BL2' as well as the driving force function BL', which is the sum of the of the driving force functions BL1'+BL2' of the model 1' of the electrodynamic acoustic transducer 1 are shown in broken lines.

It should be noted that the electronic circuit 12 just shows the general function by use of functional blocks for illustrating purposes. Putting the disclosed functions into practice may need amendments of the electronic circuit 12 and more detailed electronics. Functional blocks do not necessarily coincide with physic blocks in a real electronic circuit 12. A real physic block may incorporate more than one of the functions shown in FIG. 2. Moreover, dedicated functions of the functions shown in FIG. 2 may also be omitted in a real electronic circuit 12, and a real electronic circuit 12 may also perform more than the disclosed functions. For example, the function of the measuring circuit 13 may be integrated into the processing circuit 14.

In this example, the sound signal $U_{Sound}$ is applied to both the first coil 7 and the second coil 8, i.e. to an outer tap of the coil arrangement 6. Although this is an advantageous solution, it is not the only one. In an alternate embodiment, the sound signal $U_{Sound}$ can be applied just to the first coil 7 or just to the second coil 8.

The aforementioned deviation of the driving force functions BL, BL1 and BL2 of the real electrodynamic acoustic transducer 1 from the driving force functions BL', BL1' and BL2' of the model 1' of the electrodynamic acoustic transducer 1 may be compensated by the proposed method of determining a scaling factor k for the modeled driving force function BL', BL1', BL2' of the model 1' of the electrodynamic acoustic transducer 1.

It should be noted that the amplifier 15 may be an unipolar amplifier having one sound output and a connection to ground. In this case one outer tap of the coil arrangement 6/serially connected voice coils 7, 8 is electrically connected to the audio output of the amplifier 15, the other one is connected to ground. However, the amplifier 15 may also be a bipolar one having two dedicated sound outputs. In this case one outer tap of the coil arrangement 6/serially connected voice coils 7, 8 is electrically connected to a first audio output of the amplifier 15, the other one is connected to the other second audio output. Generally, an amplifier 15 may have more amplification stages. In this case, the outputs of the intermediate stages are not considered to have an "audio output" for the concerns of this disclosure. The "audio output" is the output of the very last stage, which finally is connected to the electrodynamic acoustic transducer 1.

It should be noted that although the presented method is disclosed in the context of a driving force function BL, BL1, BL2, BL', BL1', BL2', which links the force generated by a certain current through the coil 7, 8 to the membrane excursion x, the technical disclosure equally applies to driving functions, which link the magnetic field generated by a certain current through the coil 7, 8 to the membrane excursion x.

Embodiment 1

Figure 5:
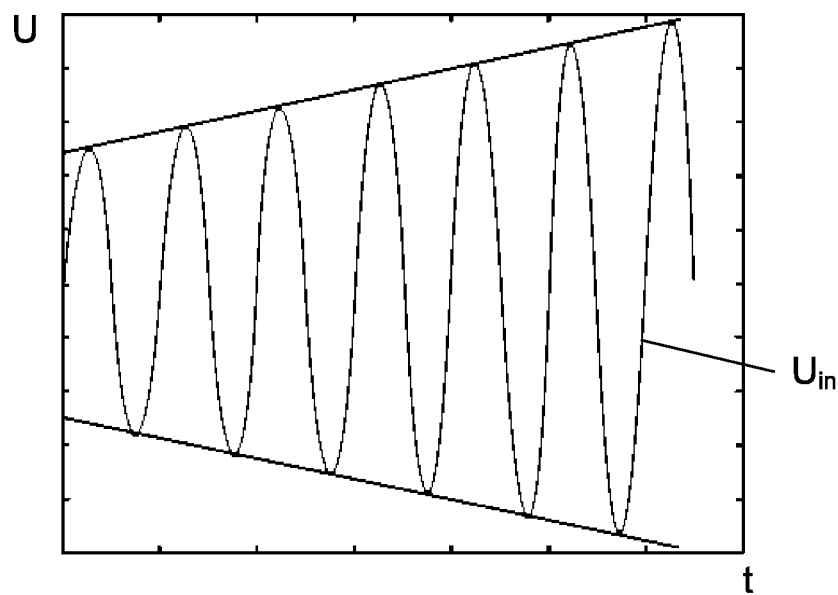
FIG. 5 shows an exemplary input signal.

In a first preferred embodiment, a first input signal $U_{in}$, which is a sine signal with a varying magnitude, is applied to the voice coils 7, 8 of the real electrodynamic acoustic transducer 1, and a second input signal $U_{in}'$, which is a sine signal with a varying magnitude as well, is applied to (the voice coils of) the model 1' of the electrodynamic acoustic transducer 1 in a first step a). FIG. 5 shows an example of such a first input signal $U_{in}$ (and equally of a second input signal $U_{in}'$). The magnitude particularly may change linearly over time, in steps or sample by sample. In detail, the input signals $U_{in}$, $U_{in}'$ should ensure that the excursion x of the membrane 3 reaches or even exceeds the magnetic zero position MP. In other words, the maximum excursion x of the membrane 3 shall correspond to the offset a of the real electrodynamic transducer or even exceed the offset a (see FIG. 3).

It should be noted that the magnitude change of the input signals $U_{in}$, should be sufficiently slow to avoid deterioration of the proposed method caused by transient effects. Beneficially, the first input signal $U_{in}$ and the second input signal $U_{in}'$ are sinus signals at the resonant frequency of the electrodynamic acoustic transducer 1.

In the above embodiment, the first input signal $U_{in}$ is applied to both voice coils 7, 8 of the real electrodynamic acoustic transducer 1, and the second input signal $U_{in}'$ is applied to both virtual voice coils of the model 1' of the electrodynamic acoustic transducer 1. Nevertheless, a first input signal $U_{in1}$ can be applied to only the voice coil 7, or a first input signal $U_{in2}$ can be applied to only the voice coil 8 of the real electrodynamic acoustic transducer 1. The same applies to the model 1' of the electrodynamic acoustic transducer 1.

Advantageously, the first input signal $U_{in}$ and the second input signal have the same frequency and are identical in particular. In this way, the effects caused by the first input signal $U_{in}$ in the real electrodynamic acoustic transducer 1 and the effects caused by the second input signal $U_{in}'$ in the model 1' of the electrodynamic acoustic transducer 1 are similar and ideally identical. Nevertheless, the first input signal $U_{in}$ and the second input signal $U_{in}'$ may also have different shapes and/or frequencies.

In a next step b), a graph of a first electromotive force $U_{emf1}$ for the first voice coil 7 and a graph of a second electromotive force $U_{emf2}$ for the second voice 8 of the real electrodynamic acoustic transducer 1 is calculated, and a graph of a first electromotive force $U_{emf1}'$ for the first voice coil and a graph of s second electromotive force $U_{emf2}'$ for the second voice coil of the model 1' of the electrodynamic acoustic transducer 1 is calculated.

The electromotive force $U_{emf1}$ of the first coil 7 and the electromotive force $U_{emf2}$ of the second coil 8 of the real electrodynamic acoustic transducer 1 are calculated by the formulas $$U_{emf1} = U_{in1} - R_{DC1} \cdot I_{in}$$

$$U_{emf2} = U_{in2} - R_{DC2} \cdot I_{in}$$

in step b) wherein $R_{DC1}$ is the (real valued) coil resistance of the first coil 7, $U_{in1}$ is the input voltage to the first coil 7 and $I_{in}$ is the input current to the first coil 7. Accordingly, $R_{DC2}$ is the (real valued) coil resistance of the second coil 8, $U_{in2}$ is the input voltage to the second coil 8 and $I_{in}$ is the input current to the second coil 8. It should be noted that the first coil 7 and the second coil 8 are switched in series so that the current $I_{in}$ is the same for both coils 7 and 8.

The electromotive forces $U_{emf1}'$, $U_{emf2}'$ of the model 1' of the electrodynamic acoustic transducer 1 may directly be obtained from the model 1'. However, if the model 1' of the electrodynamic acoustic transducer 1 is not able to output the electromotive forces $U_{emf1}'$, $U_{emf2}'$, they can be calculated by the formulas $$x(t)=A\cdot\sin(\omega t)$$

$$v(t)=A\cdot\omega\cdot\cos(\omega t)$$

$$U_{emf1,2}'=BL(x(t))\cdot A\cdot\omega\cdot\cos(\omega t)$$

$$U_{emf1,2}'=BL(A\cdot\sin(\omega t))\cdot A\cdot\omega\cdot\cos(\omega t)$$

wherein x(t) is the actual excursion of the modeled membrane, A is the amplitude of the modeled membrane 3, ω is the frequency of the second input signal, t is the time and v(t) is the actual velocity of the modeled membrane 3.

Figure 6:
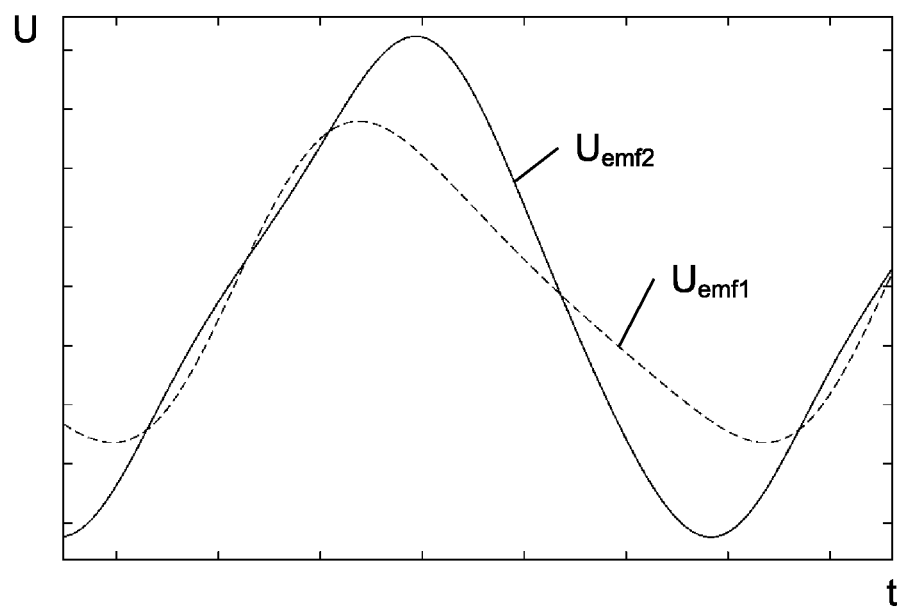
FIG. 6 shows graphs for exemplary electromotive forces generated by the first and the second coil.

FIG. 6 shows an example for the graphs of the first electromotive forces $U_{emf1}$ and $U_{emf2}$ of the real electrodynamic acoustic transducer 1.

In a next step c), the modeled driving force functions BL', BL1', BL2' are shifted by the shift b. For this reason, a ratio between the root mean square value of the first electromotive force $U_{emf1}$ or the rectified low pass filtered first electromotive force $U_{emf1}$ and the root mean square value of the second electromotive force $U_{emf2}$ or the rectified low pass filtered second electromotive force $U_{emf2}$ originating from the real electrodynamic acoustic transducer 1 is calculated. In addition, a ratio between the root mean square value of the first electromotive force $U_{emf1}'$ or the rectified low pass filtered first electromotive force $U_{emf1}'$ and the root mean square value of the second electromotive force $U_{emf2}'$ or the rectified low pass filtered second electromotive force $U_{emf2}'$ originating from the model 1' of the electrodynamic acoustic transducer 1 is repeatedly calculated for varying membrane excursions x as well. The calculation for the model 1' is repeated until the aforementioned ratio $U_{emf1}/U_{emf2}$ originating from the real electrodynamic acoustic transducer 1 substantially equals the aforementioned ratio $U_{emf1}'/U_{emf2}'$ originating from the model 1' of the electrodynamic acoustic transducer 1. In other words, the calculation for the model 1' is repeated until a deviation between the aforementioned ratio $U_{emf1}/U_{emf2}$ originating from the real electrodynamic acoustic transducer 1 and the aforementioned ratio originating $U_{emf1}'/U_{emf2}'$ from the model 1' of the electrodynamic acoustic transducer 1 is below a predetermined threshold.

A cut off frequency of a low pass used for low pass filtering the graphs of the electromotive forces $U_{emf1}$, $U_{emf2}$ originating from the real electrodynamic acoustic transducer 1 and the graphs of the electromotive forces $U_{emf1}'$, $U_{emf2}'$ originating from the model 1' of the electrodynamic acoustic transducer 1 beneficially is below the lower cutoff frequency of the frequency range of the electrodynamic acoustic transducer 1 and particularly <20 Hz. In this way, the averaging effect is comparably strong in the region of the resonant frequency of the electrodynamic acoustic transducer 1.

In a next step d), a graph of a difference $\Delta U_{emf}$ of the first electromotive force $U_{emf1}$ and the second electromotive force $U_{emf2}$ for the real electrodynamic acoustic transducer 1 is calculated and the first time point $t_1$ is selected in the graph of said difference $\Delta U_{emf}$ where a gradient of said graph of said difference $\Delta U_{emf}$ is substantially zero. In addition, a graph of a difference $\Delta U_{emf}'$ of the first electromotive force $U_{emf1}'$ and the second electromotive force $U_{emf2}'$ for the model 1' of the electrodynamic acoustic transducer 1 is calculated and the second time point $t_2$ is selected in the graph of said difference $\Delta U_{emf}'$ where a gradient of said graph of said difference $\Delta U_{emf}'$ is substantially zero, too. In other words, time points $t_1$ and $t_2$ are searched/selected where the absolute values of the gradients reach their minimum in the graphs $\Delta U_{emf}=U_{emf1}-U_{emf2}$ and $\Delta U_{emf}'=U_{emf1}'-U_{emf2}'$. At or around these time points $t_1$ and $t_2$, the differences of two subsequent samples in the graphs $\Delta U_{emf}=U_{emf1}-U_{emf2}$ and $\Delta U_{emf}'=U_{emf1}'-U_{emf2}'$ reach their minimum. Further on, the graphs $\Delta U_{emf}=U_{emf1}-U_{emf2}$ and $\Delta U_{emf}'=U_{emf1}'-U_{emf2}'$ should be zero or close to zero. It should be noted, that the first time point $t_1$ does not necessarily equal the second time point $t_2$ because the behavior of the real electrodynamic transducer 1 and its model 1' still is different.

Figure 7:
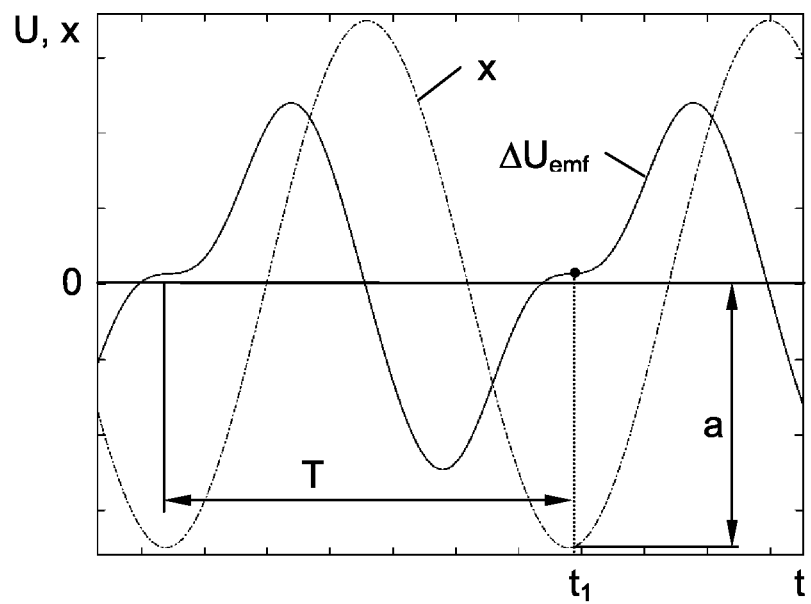
FIG. 7 shows a difference graph of the electromotive forces of FIG. 6 along with a membrane excursion where the membrane's amplitude corresponds to the offset of the magnetic zero position.

An example for graph of a difference $\Delta U_{emf}$ of the first electromotive force $U_{emf1}$ and the second electromotive force $U_{emf2}$ for the real electrodynamic acoustic transducer 1 and a first time point $t_1$ is shown in FIG. 7. At this time point $t_1$, the membrane excursion x equals the offset a, a' of the magnetic zero positions MP, MP' for the real electrodynamic acoustic transducer 1 and its model 1'. In other words, one of the reversal points of the membrane 3 is located exactly at the magnetic zero positions MP, MP'. Moreover, the excursion x of the membrane 3 of the real electrodynamic acoustic transducer 1 and of the model 1' are equal at said first time point $t_1$ and said second time point $t_2$. As can be seen in FIG. 7, the graphs $\Delta U_{emf}=U_{emf1}-U_{emf2}$ and $\Delta U_{emf}'=U_{emf1}'-U_{emf2}'$ each comprise two zero crossings per period of the input signal $U_{in}$ and $U_{in}'$ in this embodiment (note that $\Delta U_{emf}'=U_{emf1}'-U_{emf2}'$ looks similar to $\Delta U_{emf}=U_{emf1}-U_{emf2}$).

Do also note that the a=a' in this stage because the magnetic zero position MP' of the model 1' of the electrodynamic acoustic transducer 1 has been corrected already and ideally coincides with the magnetic zero position MP of the real electrodynamic acoustic transducer 1. It should also be noted that the real offset a is known at this stage because of the relation a=a'-b (see FIG. 3) and because a' is known from the model 1' and b is known from the shift procedure of step c). Finally, it should be noted that the membrane excursion x=a at the first time point $t_1$, which marks the equality of the driving force functions BL1 for the first coil 7 and the driving force function BL2 (magnetic zero position MP). At this first time point $t_1$, the gradient of the graph of $\Delta U_{emf}=0$. Accordingly, the modeled membrane reaches its maximum excursion at the second time point $t_1$.

In a next step e), the scaling factor k for the shifted modeled driving force function BL', BL1', BL2' is determined by use of a deviation of the electromotive forces $U_{emf1}$, $U_{emf2}$ originating from the real electrodynamic acoustic transducer 1 at said first time point $t_1$ or in a time span including said first time point $t_1$ from the electromotive forces $U_{emf1}'$, $U_{emf2}'$ originating from the model 1' of the electrodynamic acoustic transducer 1 at said second time point $t_2$ or in a time span including said second time point $t_2$. In detail, the scaling factor k for the modeled driving force function BL', BL1', BL2' is set to a value, for which a difference between the graph of the first or second electromotive force $U_{emf1}$, $U_{emf2}$ or of their sum originating from the real electrodynamic acoustic transducer 1 during a time span of at least one time period of the first input signal $U_{in}$, $U_{in1}$, $U_{in2}$ including said first time point $t_1$ found in step d) and the graph of the first or second electromotive force $U_{emf1}'$, $U_{emf2}'$ or of their sum originating from the model 1' of the electrodynamic acoustic transducer 1 during a time span of at least one time period of the second input signal $U_{in}'$, $U_{in1}'$, $U_{in2}'$ including said second time point $t_2$ found in step d) is below a predetermined threshold based on the least mean square algorithm in step e). Note in this context that the time period T of the first input signal $U_{in}$ equals the time period of the excursion x membrane 3. The same equally counts for the modeled membrane, which oscillates at the frequency of the second input signal $U_{in}'$. In this example the frequency of the first input signal $U_{in}$ equals the frequency of the second input signal $U_{in}'$. Accordingly, the time periods T are equal as well.

Beneficially, the scaling factor k can be computed precisely in the above way because the calculation is not based on single values of the electromotive forces $U_{emf1}$, $U_{emf2}$, but on their graphs. In particular, the calculation can be based on the graph of the sum $U_{emf}$ of the electromotive forces $U_{emf1}$, $U_{emf2}$ originating from the real electrodynamic acoustic transducer 1 and on the graph of the sum $U_{emf}'$ of the electromotive forces $U_{emf1}'$, $U_{emf2}'$ originating from the model 1' of the electrodynamic acoustic transducer 1.

Finally, the modeled driving force function BL', BL1', BL2' is updated by multiplying the modeled driving force function BL', BL1', BL2' with the scaling factor k in a step f).

Embodiment 2

In a second embodiment, which is similar to the first embodiment, the scaling factor k is determined in a slightly different way.

In contrast to the first embodiment, the first input signal $U_1$ applied to the voice coils 7, 8 of the electrodynamic acoustic transducer 1 in step a) is a sine signal with constant magnitude and not a sine signal with a varying magnitude. Nevertheless, the second input signal $U_{in}'$ applied to the model 1' of the electrodynamic acoustic transducer 1 in step a) again is a sine signal with a varying magnitude. Beneficially, the first input signal $U_{in}$ and the second input signal $U_{in}'$ are sinus signals at the resonant frequency of the electrodynamic acoustic transducer 1 again.

Shifting the modeled driving force function BL', BL1', BL2' in step c) is done in the same way as in the embodiment 1. In particular it should be taken care of that step c) is executed at the same or at least comparable membrane excursions x in the real electrodynamic acoustic transducer 1 and its model 1'. Step c) may also recursively repeated. In particular, a new shifted driving force function BL', BL1', BL2' may be used in each iteration.

However, in this second embodiment, the excursion x of the membrane 3 exceeds the magnetic zero positions MP, MP', i.e. the crossing points of the driving force functions BL1, BL2 and BL1', BL2' for the first coil 7 and the second coil 8 of the real electrodynamic acoustic transducer 1 and it's model 1'. Furthermore, the graphs $\Delta U_{emf}$ and $\Delta U_{emf}'$ each comprise four zero crossings per period T of the input signals $U_{in}$, $U_{in}'$ in this embodiment. Accordingly, for finding the time points, at which the membrane excursion x becomes maximal, time points $t_1$, $t_2$ are searched where two outer zero crossings of three zero crossings are within a half period T/2 of the first input signal $U_{in}$ and/or the second input signal $U_{in}'$ ($\Delta t < T/2$). The time shift $\Delta t$ or phase shift between the two outer zero crossings at the first time point $t_1$ in the real electrodynamic acoustic transducer 1 shall equal the time or phase shift between the two outer zero crossings at the second time point $t_2$ in the model 1' of the electrodynamic acoustic transducer 1. Alternatively, time points $t_1$, $t_2$ may be searched in the graphs $\Delta U_{emf} = U_{emf1} - U_{emf2}$ and $\Delta U_{emf}' = U_{emf1}' - U_{emf2}'$ where absolute values of their gradients become minimal in step d). This is an alternative way to find time points, at which the membrane excursion x becomes maximal in the electrodynamic acoustic transducer 1 and its model 1'.

Figure 8:
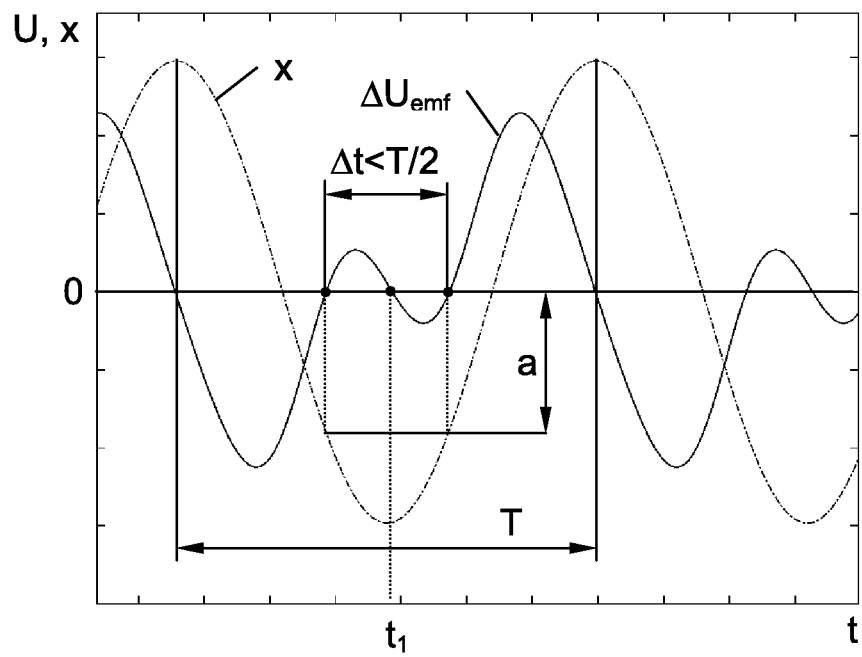
FIG. 8 shows a difference graph of the electromotive forces similar to those of FIG. 6 along with a membrane excursion where the membrane's amplitude exceeds the offset of the magnetic zero position.

FIG. 8 shows an exemplary graph $\Delta U_{emf}$ as well as the membrane excursion x for the real electrodynamic acoustic transducer 1. However, the graph $\Delta U_{emf}'$ for the model 1' of the electrodynamic acoustic transducer 1 and also it's membrane excursion look quite similar.

A distinct amplitude of the membrane excursion x can be determined by the triple of zero crossings of the graph $\Delta U_{emf}$ of the real electrodynamic acoustic transducer 1 in the region of the reversal point of the membrane 3 given the aforementioned time delay $\Delta t$ between the outer zero crossings. At the outer zero crossings, the membrane excursion x corresponds to the offset a of the magnetic zero position MP from the membrane's zero or idle position IP. In a next step, a sine function is searched, which has the frequency of the input signal $U_{in}$ (or of the membrane 3) and runs through the aforementioned membrane excursions (i.e. through the offset a of the magnetic zero position MP at the outer zero crossings of the graph $\Delta U_{emf}$). The maximum of this sine function corresponds to the amplitude of the membrane 3 at the first time point $t_1$. Subsequently, the second time point $t_2$ is searched in the graph of the excursion x of the membrane 3 where the amplitude of the model's membrane corresponds to the above amplitude of the real membrane 3. Alternatively, the second time point can be searched in the graph of the difference $\Delta U_{emf}'$ where the time difference or the phase angle of the outer zero crossings of the three zero crossings corresponds to the time difference $\Delta t$ or the phase angle of the outer zero crossings of the three zero crossings in the graph of the difference $\Delta U_{emf}$ of the real electrodynamic acoustic transducer 1 at the first time point $t_1$.

Finally, the scaling factor k can be calculated in the same way as in the first embodiment in step e), and the modeled driving force function BL', BL1', BL2' can be updated by multiplying the modeled driving force function BL', BL1', BL2' with the scaling factor k in step f) again.

Advantageously, a deviation between the graphs of the electromotive forces $U_{emf1}$, $U_{emf2}$ of the real electrodynamic acoustic transducer 1 and the electromotive forces $U_{emf1}'$, $U_{emf2}'$ of the model 1' of the electrodynamic acoustic transducer 1 is very high because of the high velocity of the membrane 3. In turn, also a very good signal to noise ratio (SNR) is obtained. That is why a scaling factor k can precisely be determined in this embodiment.

General:

In the aforementioned embodiments, sine signals are used as input signals $U_{in}$ and $U_{in}'$ what is beneficially, but not mandatory. Alternatively, the first input signal $U_{in}$ and/or the second input signal $U_{in}'$ can be noise signals in step a), in particular spectrally shaped noise signals. In this way, multiple spectral effects can be taken into consideration in a single step.

Moreover, input signals $U_{in}$ and at the resonant frequency of the electrodynamic acoustic transducer 1 are used in the aforementioned embodiments. When using input signals $U_{in}$ and at the resonant frequency of the electrodynamic acoustic transducer 1, the excursion x of the membrane 3 is high compared to the power of the input signals $U_{in}$ and $U_{in}'$. That is why the electrodynamic acoustic transducer 1 does not heat up much causing just a small drift of the parameters of the electrodynamic acoustic transducer 1. High membrane excursion x also means high amplitudes for the electromotive forces $U_{emf1}$, $U_{emf2}$ and $U_{emf1}'$, $U_{emf2}'$. Moreover, the movement of the membrane 3 is (almost) a sinusoidal curve. It should also be noted that generally determining the real value of the coil resistances $R_{DC1}$ and $R_{DC2}$ is needed for determining the electromotive forces $U_{emf1}$, $U_{emf2}$. Due to losses in the electrodynamic acoustic transducer 1 while applying an electrical signal $U_{in}$ and $U_{in}'$, the coil resistances $R_{DC1}$ and $R_{DC2}$ change over time. That is why commonly an ongoing measurement of the coil resistances $R_{DC1}$ and $R_{DC2}$ is required, for example by means of a (low frequency) pilot tone. However, by use of input signals $U_{in}$ and $U_{in}'$ at the resonant frequency of the electrodynamic acoustic transducer 1, the (real valued) coil resistances $R_{DC1}$ and $R_{DC2}$ can initially be measured using any state-of-the-art method without the need of an ongoing application of a pilot signal.

Although the use of input signals $U_{in}$ and $U_{in}'$ at the resonant frequency is advantageous, also a different frequency range may be chosen. Alternatively, the first input signal $U_{in}$ and/or the second input signal $U_{in}'$ can have only frequency components above 0.95 times the resonant frequency of the electrodynamic acoustic transducer 1. Advantageously, the compliance of the membrane 3 does not much influence the result of the presented method in this range. Further alternatively, the first input signal $U_{in}$ and/or the second input signal $U_{in}'$ may have only frequency components below 0.95 times the resonant frequency of the electrodynamic acoustic transducer 1. In this way, the proposed method of determining a scaling factor k can be performed inaudible or almost inaudible, in particular if a frequency in the range of 100 Hz is used for the input signals $U_{in}$, $U_{in}'$.

In addition, the first input signal $U_{in}$ and the second input signal $U_{in}'$ have the same frequency in the above embodiment. In this way, the effects caused by the first input signal $U_{in}$ in the real electrodynamic acoustic transducer 1 and the effects caused by the second input signal $U_{in}'$ in the model 1' of the electrodynamic acoustic transducer 1 are very similar. However, in principle, also input signals $U_{in}$, $U_{in}'$ at different frequencies or with different frequency components can be used.

In the aforementioned embodiments, the scaling factor k is determined by the use of a least mean square algorithm applied to the graphs of electromotive forces $U_{emf1}$, $U_{emf2}$ originating from the real electrodynamic acoustic transducer 1 and the graphs of the electromotive forces $U_{emf1}'$, $U_{emf2}'$ originating from the model 1' of the electrodynamic acoustic transducer 1. Although this advantageous, this is no necessary condition for the proposed method.

Alternatively, in step e) the scaling factor k for the modeled driving force function BL', BL1', BL2' can be set to the ratio between the maximum of the first or second electromotive force $U_{emf1}$, $U_{emf2}$ or their maximum sum originating from the real electrodynamic acoustic transducer 1 in a period of the first input signal $U_{in}$, which includes the first time point $t_1$ found in step d), and the first or second electromotive force $U_{emf1}'$, $U_{emf2}'$ or their maximum sum originating from the model 1' of the electrodynamic acoustic transducer 1 in a period of the second input signal $U_{in}'$, which includes the second time point $t_2$ found in step d). In this embodiment, single values of the electromotive forces are used. That is why the calculation of the scaling factor k is comparably simple. In particular, the ratio between the sum $U_{emf}$ of the electromotive forces $U_{emf1}$, $U_{emf2}$ originating from the real electrodynamic acoustic transducer 1 and the sum $U_{emf}'$ of the electromotive forces $U_{emf1}'$, $U_{emf2}'$ originating from the model 1' of the electrodynamic acoustic transducer 1 can be used to compute the scaling factor k.

In the first embodiment, the scaling factor k was determined by use of time points $t_1$, $t_2$ where the gradient=0 in the graphs $\Delta U_{emf}=U_{emf1}-U_{emf2}$ and $\Delta U_{emf}'=U_{emf1}'-U_{emf2}'$, and in the second embodiment the scaling factor k was determined by use of a pattern of three subsequent zero crossings of $U_{emf}=U_{emf1}-U_{emf2}$ and $\Delta U_{emf}'=U_{emf1}'-U_{emf2}'$ within a half period T/2 of the input signal $U_{in}$, $U_{in}'$. Nevertheless, it is possible to determine the scaling factor k in a different way.

For example, a graph of a difference $\Delta U_{emf}$ of the first electromotive force $U_{emf1}$ and the second electromotive force $U_{emf2}$ for the real electrodynamic acoustic transducer 1 is calculated and the first time point $t_1$ is selected in the graph of said difference $\Delta U_{emf}$ where said difference $\Delta U_{emf}$ is substantially zero, and a graph of a difference $\Delta U_{emf}'$ of the first electromotive force $U_{emf1}'$ and the second electromotive force $U_{emf2}'$ for the model 1' of the electrodynamic acoustic transducer 1 with the shifted modeled driving force function BL', BL1', BL2' is calculated and the second time point $t_2$ is selected in the graph of said difference $\Delta U_{emf}'$ where said difference $\Delta U_{emf}'$ is substantially zero in step d). In other words, time points are searched/selected where $\Delta U_{emf}=U_{emf1}-U_{emf2}=0$ and $\Delta U_{emf}'=U_{emf1}'-U_{emf2}'=0$. That means, the first electromotive force $U_{emf1}$ and the second electromotive force $U_{emf2}$ for the real electrodynamic acoustic transducer are equal in the first time point $t_1$, and the first electromotive force $U_{emf1}'$ and the second electromotive force $U_{emf2}'$ for the model 1' of the electrodynamic acoustic transducer 1 are equal in the second time point $t_2$. At or around the first time point $t_1$, two subsequent samples in the graph $\Delta U_{emf}=U_{emf1}-U_{emf2}$ have different signs, and at or around the second time point $t_2$, two subsequent samples in the graph $\Delta U_{emf}'=U_{emf1}'-U_{emf2}'$ have different signs. Again, the membrane excursion x for the real electrodynamic acoustic transducer 1 is maximal in the first time point $t_1$ and maximal in the second time point $t_2$ for the model 1' of the electrodynamic acoustic transducer 1.

The scaling factor k can be calculated in the same way as indicated in the aforementioned examples in step e), and the modeled driving force function BL', BL1', BL2' can be updated by multiplying the modeled driving force function BL', BL1', BL2' with the scaling factor k in step f).

In yet another example, a graph of a difference $\Delta U_{emf}$ of the first electromotive force $U_{emf1}$ and the second electromotive force $U_{emf2}$ for the real electrodynamic acoustic transducer 1 is calculated and the first time point $t_1$ is selected in the graph of said difference $\Delta U_{emf}$ where an absolute value of the gradient of said graph of said difference $\Delta U_{emf}$ becomes minimal, and a graph of a difference $\Delta U_{emf}'$ of the first electromotive force $U_{emf1}'$ and the second electromotive force $U_{emf2}'$ for the model 1' of the electrodynamic acoustic transducer 1 with the shifted modeled driving force function BL', BL1', BL2' is calculated and the second time point $t_2$ is selected in the graph of said difference $\Delta U_{emf}'$ where an absolute value of the gradient of said graph of said difference $\Delta U_{emf}'$ becomes minimal in step d). In other words, time points $t_1$, $t_2$ are searched/selected where the absolute values of the gradients reach their minimum in the graphs $\Delta U_{emf}=U_{emf1}-U_{emf2}$ and $\Delta U_{emf}'=U_{emf1}'-U_{emf2}'$. At or around these time points, the differences of two subsequent samples in the graphs $\Delta U_{emf}=U_{emf1}-U_{emf2}$ and $\Delta U_{emf}'=U_{emf1}'-U_{emf2}'$ reach their minimum. Further on, the graphs $\Delta U_{emf}=U_{emf1}-U_{emf2}$ and $\Delta U_{emf}'=U_{emf1}'-U_{emf2}'$ should be zero or close to zero. In these time points, the first input signal $U_{in}$ and the second input signal $U_{in}'$ have a level causing the real membrane 3 and the model membrane to reach their maximum excursions x.

In particular, a first time point $t_1$ is selected in the graph of said difference $\Delta U_{emf}$ where an absolute value of the gradient of said graph of said difference $\Delta U_{emf}$ is positive, and a second time point $t_2$ is selected in the graph of said difference $\Delta U_{emf}'$ where an absolute value of the gradient of said graph of said difference $\Delta U_{emf}'$ is positive, too, in step d). In other words, time points $t_1$, $t_2$ are searched/selected where the gradient >0 or <0 in the graphs $\Delta U_{emf}=U_{emf1}-U_{emf2}$ and $\Delta U_{emf}'=U_{emf1}'-U_{emf2}'$. In this range, the input signals have a level causing the real membrane 3 and the modeled membrane to excurse beyond the magnetic zero positions MP, MP'. In other words, the membrane excursion x exceeds the offset a, a' of the magnetic zero positions MP, MP' from the zero or idle position IP of the membrane 3, and the reversal point of the membrane 3 is located beyond the magnetic zero positions MP, MP'. In this embodiment, the graphs $\Delta U_{emf} = U_{emf1} - U_{emf2}$ and $\Delta U_{emf}' = U_{emf1}' - U_{emf2}'$ each comprise four zero crossings per period T of the input signal $U_{in}$, $U_{in}'$. Advantageously, a deviation between the graphs of the electromotive forces $U_{emf1}$, $U_{emf2}$ of the real electrodynamic acoustic transducer 1 and the electromotive forces $U_{emf1}'$, $U_{emf2}'$ of the model 1' of the electrodynamic acoustic transducer 1 is very high because of the high velocity of the membrane 3. In turn, also a very good signal to noise ratio (SNR) is obtained. That is why a scaling factor k can precisely be determined in this embodiment.

Again, the scaling factor k can be calculated in the same way as indicated in the aforementioned examples in step e), and the modeled driving force function BL', BL1', BL2' can be updated by multiplying the modeled driving force function BL', BL1', BL2' with the scaling factor k in step f).

Generally, the proposed method of determining a scaling factor k for a modeled driving force function BL', BL1', BL2' dependent on a membrane excursion of a model 1' of an electrodynamic acoustic transducer 1 having at least two voice coils 7, 8, comprises the following steps, which are particularly performed by the electronic circuit 12 or in more detail by the processing circuit 14:

In a step a) a first input signal $U_{in}$, $U_{in}'$ is applied to at least one of the voice coils 7, 8 of the real electrodynamic acoustic transducer 1 and a second input signal $U_{in}$, $U_{in}'$ is applied to the model 1' of the electrodynamic acoustic transducer 1, which model 1' is based on said modeled driving force function BL', BL1', BL2'.

In a step b) a graph of a first electromotive force $U_{emf1}$ for a first voice coil 7 of the voice coils 7, 8 and a second electromotive force $U_{emf2}$ for a second voice 8 coil of the voice coils 7, 8 of the real electrodynamic acoustic transducer 1 is calculated, and a graph of a first electromotive force $U_{emf1}'$ for a first voice coil 7 of the voice coils 7, 8 and a second electromotive force $U_{emf2}'$ for a second voice 8 coil of the voice coils 7, 8 of the model 1' of the electrodynamic acoustic transducer 1 is calculated.

In a step c) the modeled driving force function BL', BL1', BL2' is shifted by modification of the excursion argument x until a deviation between the ratio between the first electromotive force $U_{emf1}$ and the second electromotive force $U_{emf2}$ of the real electrodynamic acoustic transducer 1 and the ratio between the first electromotive force $U_{emf1}'$ and the second electromotive force $U_{emf2}'$ of the model 1' of the electrodynamic acoustic transducer 1 is below a predetermined threshold.

In a step d) a first time point $t_1$ is found/selected where the first electromotive force $U_{emf1}$ substantially equals the second electromotive force $U_{emf2}$ of the real electrodynamic acoustic transducer 1, and a second time point $t_2$ is found/selected where the first electromotive force $U_{emf1}'$ substantially equals the second electromotive force $U_{emf2}'$ of the model 1' of the electrodynamic acoustic transducer 1 with the shifted modeled driving force function BL', BL1', BL2'.

In a step e) the scaling factor k is determined for the shifted modeled driving force function BL', BL1', BL2' by use of a deviation of the electromotive forces $U_{emf1}$, $U_{emf2}$ originating from the real electrodynamic acoustic transducer 1 at said first time point $t_1$ or in a time span including said first time point $t_1$ from the electromotive forces $U_{emf1}'$, $U_{emf2}'$ originating from the model 1' of the electrodynamic acoustic transducer 1 at said second time point $t_2$ or in a time span including said second time point $t_2$.

In a step f) finally the modeled driving force function BL', BL1', BL2' is updated by multiplying the modeled driving force function BL', BL1', BL2' with the scaling factor k.

After the above steps a) to f), the model 1' in the electronic circuit 12 corresponds to reality as much as possible.

Generally, it is of advantage if steps a) to f) are executed in a state, in which the electrodynamic acoustic transducer 1 is built into a target device. In this way, the method of determining scaling factor k for a driving force function BL1', BL2', BL' of a model 1' of an electrodynamic acoustic transducer 1 can be executed in the environment, in which the electrodynamic acoustic transducer 1 is finally used. In particular, the method can be repeated from time to time to consider aging of the electrodynamic acoustic transducer 1. A target device for example can be a mobile phone, ear phones, a laptop or any other device using this electrodynamic acoustic transducer 1.

In summary, the electronic circuit 12 provides or at least supports a proper solution to keep distortions low while avoiding damage of the electrodynamic acoustic transducer 1 even at high output levels. In combination with the electrodynamic acoustic transducer 1 an advantageous transducer system is presented which allows for easy operation. A user just needs to feed a signal $U_{sound}$ to be converted into sound to the transducer system and does not need to care about distortions and/or avoiding damage of the electrodynamic acoustic transducer 1. Preferably, the electronic circuit 12 and the electrodynamic acoustic 1 are embodied as a single device or module. For example, the electronic circuit 12 can be arranged in the housing 2 of the electrodynamic acoustic transducer 1.

It should also be noted that the invention is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES 1 (real) electrodynamic acoustic transducer
2 housing
3 membrane
4 bending section
5 stiffened center section
6 coil arrangement
7 first coil
8 second coil
9 magnet
10 pot plate
11 top plate
12 electronic circuit
13 measuring circuit
14 processing circuit
15 amplifier 1' model of electrodynamic acoustic transducer
A current measuring device
V1 first voltage measuring device
V2 second voltage measuring device
T1 . . . T3 connection terminals
B magnetic field
Z1 impedance of the first coil
Z2 impedance of the second coil
BxL driving force function/factor
BL1 driving force function of the real first coil
BL2 driving force function of the real second coil
BL total driving force function of the real coils
BL1' driving force function of the modeled first coil
BL2' driving force function of the modeled second coil
BL' total driving force function of the modeled coils
MP magnetic zero position of real electrodynamic acoustic transducer
MP' magnetic zero position of modeled electrodynamic acoustic transducer
IP membrane idle position
$I_{in}$ input current
$U_{in1}$ input signal (voltage) at the first coil of real transducer
$U_{in2}$ input signal (voltage) at the second coil of real transducer
$U_{in}$ input signal (voltage) at both coils of real transducer
$U_{in1}'$ input signal at the first coil of modeled transducer
$U_{in2}'$ input signal at the second coil of modeled transducer
$U_{in}'$ input signal to model of electrodynamic acoustic transducer
$U_{emf1}$ electromotive force of first coil of real transducer
$U_{emf2}$ electromotive force of second coil of real transducer
$\Delta U_{emf}$ difference of first and second electromotive force of real transducer
$U_{emf1}'$ electromotive force of first coil of modeled transducer
$U_{emf2}'$ electromotive force of first coil of modeled transducer
$\Delta U_{emf}'$ electromotive force of first coil of modeled transducer
U voltage
$U_{Sound}$ sound signal
v membrane velocity
x membrane excursion
a offset of real magnetic zero position
a' (initial) offset of modeled magnetic zero position
b offset difference/shift
t time
$t_1$ first time point
$t_2$ second time point
T period
$\Delta t$ time shift/time difference

What is claimed is:

1. A method of determining a scaling factor k for a modeled driving force function dependent on a membrane excursion of a model of an electrodynamic acoustic transducer having at least two voice coils, comprising the steps of:
   a) applying a first input signal to at least one of the voice coils of the real electrodynamic acoustic transducer and applying a second input signal to the model of the electrodynamic acoustic transducer;
   b) calculating a graph of a first electromotive force for a first voice coil of the at least two voice coils and a second electromotive force for a second voice coil of the at least two voice coils of the real electrodynamic acoustic transducer and calculating a graph of a first electromotive force for a first voice coil of the voice coils and a second electromotive force for a second voice coil of the voice coils of the model of the electrodynamic acoustic transducer;
   c) shifting the modeled driving force function by modification of an excursion argument until a deviation between a ratio between the first electromotive force and the second electromotive force of the real electrodynamic acoustic transducer and the ratio between the first electromotive force and the second electromotive force of the model of the electrodynamic acoustic transducer is below a predetermined threshold;
   d) finding/selecting a first time point where the first electromotive force substantially equals the second electromotive force of the real electrodynamic acoustic transducer and finding/selecting a second time point where the first electromotive force substantially equals the second electromotive force of the model of the electrodynamic acoustic transducer with the shifted modeled driving force function;
   e) determining the scaling factor k for the shifted modeled driving force function by use of a deviation of the electromotive forces originating from the real electrodynamic acoustic transducer at said first time point or in a time span including said first time point from the electromotive forces originating from the model of the electrodynamic acoustic transducer at said second time point or in a time span including said second time point; and
   f) updating the modeled driving force function by multiplying the modeled driving force function with the scaling factor k.

2. The method as claimed in claim 1, characterized in that the first input signal and/or the second input signal is a sine signal with constant magnitude in step a).

3. The method as claimed in claim 1, characterized in that the first input signal and/or the second input signal is a sine signal with a varying magnitude.

4. The method as claimed in claim 1, characterized in that the first input signal and/or the second input signal is a noise signal in step a).

5. The method as claimed in claim 1, characterized in that the first input signal and/or the second input signal has only frequency components above 0.95 times the resonant frequency of the electrodynamic acoustic transducer.

6. The method as claimed in claim 1, characterized in that the first input signal and/or the second input signal has only frequency components below 0.95 times the resonant frequency of the electrodynamic acoustic transducer.

7. The method as claimed in claim 1, characterized in that a frequency of the first input signal and/or a frequency of the second input signal substantially equals the resonant frequency of the electrodynamic acoustic transducer.

8. The method as claimed in claim 1, characterized in that the first input signal and the second input signal have the same frequency or frequency components.

9. The method as claimed in claim 1, characterized in that the first input signal and the second input signal are identical.

10. The method as claimed in claim 1, characterized in that the electromotive force of the first coil of the real electrodynamic acoustic transducer ($U_{emf1}$) and the electromotive force of the second coil of the real electrodynamic acoustic transducer ($U_{emf2}$) are calculated by the formulas $$U_{emf1} = U_{in1} - R_{DC1} \cdot I_{in}$$

$$U_{emf2} = U_{in2} - R_{DC2} * I_{in}$$

in step b) wherein $R_{DC1}$ is a coil resistance of the first coil of the real electrodynamic acoustic transducer, $U_{in1}$ is an input voltage to the first coil of the real electrodynamic acoustic transducer and $I_{in}$ is an input current to the first coil of the real electrodynamic acoustic transducer, and $R_{DC2}$ is a coil resistance of the second coil of the real electrodynamic acoustic transducer, $U_{in2}$ is an input voltage to the second coil of the real electrodynamic acoustic transducer and $I_{in}$ is an input current to the second coil of the real electrodynamic acoustic transducer.

11. The method as claimed in claim 1, characterized in that the electromotive force of the first coil of the modeled electrodynamic acoustic transducer ($U_{emf1}'$) and the electromotive force of the second coil of the modeled electrodynamic acoustic transducer ($U_{emf2}'$) are calculated by the formulas $$x(t) = A \cdot \sin(\omega t)$$

$$v(t) = A \cdot \omega \cdot \cos(\omega t)$$

$$U_{emf1,2}' = BL(x(t)) \cdot A \cdot \omega \cdot \cos(\omega t)$$

$$U_{emf1,2}' = BL(A \cdot \sin(\omega t)) \cdot A \cdot \omega \cdot \cos(\omega t)$$

wherein x(t) is the membrane excursion of a modeled membrane, A is an amplitude of the modeled membrane, ω is a frequency of the second input signal, t is a time, and v(t) is an actual velocity of the modeled membrane.

12. The method as claimed in claim 1, characterized in that a shift for the modeled driving force function being dependent on the membrane excursion is determined by use of a root mean square value of the electromotive forces originating from the real electrodynamic acoustic transducer and of a root mean square value of the electromotive forces originating from the model of the electrodynamic acoustic transducer in step c).

13. The method as claimed in claim 12, characterized in that the modeled driving force function is shifted by the shift until a ratio between the root mean square value of the first electromotive force or the rectified low pass filtered first electromotive force and the root mean square value of the second electromotive force or the rectified low pass filtered second electromotive force originating from the real electrodynamic acoustic transducer substantially equals said ratio for the electromotive forces originating from the model of the electrodynamic acoustic transducer in step c).

14. The method as claimed in claim 1, characterized in that a shift for modeled driving force function being dependent on the membrane excursion is determined by use of a rectified and low pass filtered graph of the electromotive forces originating from the real electrodynamic acoustic transducer and of a rectified and low pass filtered graph of the electromotive forces originating from the model of the electrodynamic acoustic transducer in step c).

15. The method as claimed in claim 14, characterized in that a cut off frequency of a low pass used for low pass filtering the graph of the electromotive forces originating from the real electrodynamic acoustic transducer and the graph of the electromotive forces originating from the model of the electrodynamic acoustic transducer is below a lower cutoff frequency of a frequency range of the real electrodynamic acoustic transducer.

16. The method as claimed in claim 1, characterized in that a graph of a difference of the first electromotive force and the second electromotive force for the real electrodynamic acoustic transducer is calculated and the first time point is selected in the graph of said difference where said difference is substantially zero, and a graph of a difference of the first electromotive force and the second electromotive force for the model of the electrodynamic acoustic transducer with the shifted modeled driving force function is calculated and the second time point is selected in the graph of said difference where said difference is substantially zero in step d).

17. The method as claimed in claim 1, characterized in that a graph of a difference of the first electromotive force and the second electromotive force for the real electrodynamic acoustic transducer is calculated and the first time point is selected in the graph of said difference where an absolute value of the gradient of said graph of said difference becomes minimal, and a graph of a difference of the first electromotive force and the second electromotive force for the model of the electrodynamic acoustic transducer with the shifted modeled driving force function is calculated and the second time point is selected in the graph of said difference where an absolute value of the gradient of said graph of said difference becomes minimal in step d).

18. The method as claimed in claim 1, characterized in that a graph of a difference of the first electromotive force and the second electromotive force for the real electrodynamic acoustic transducer is calculated and the first time point is selected in the graph of said difference where a gradient of said graph of said difference is substantially zero, and a graph of a difference of the first electromotive force and the second electromotive force for the model of the electrodynamic acoustic transducer with the shifted modeled driving force function is calculated and the second time point is selected in the graph of said difference where a gradient of said graph of said difference is substantially zero in step d).

19. The method as claimed in claim 1, characterized in that a graph of a difference of the first electromotive force and the second electromotive force for the real electrodynamic acoustic transducer is calculated and the first time point is selected in the graph of said difference where an absolute value of the gradient of said graph of said difference is positive, and a graph of a difference of the first electromotive force and the second electromotive force for the model of the electrodynamic acoustic transducer with the shifted modeled driving force function is calculated and the second time point is selected in the graph of said difference where an absolute value of the gradient of said graph of said difference is positive in step d).

20. The method as claimed in claim 1, characterized in that a graph of a difference of the first electromotive force and the second electromotive force for the real electrodynamic acoustic transducer is calculated and the first time point is selected in the graph of said difference where two outer zero crossings of three zero crossings are within a half period (T/2) of the first input signal, and a graph of a difference of the first electromotive force and the second electromotive force for the model of the electrodynamic acoustic transducer with the shifted modeled driving force function is calculated and the second time point is selected in the graph of said difference where two outer zero crossings of three zero crossings are within a half period of the second input signal in step d).

21. The method as claimed in claim 1, characterized in that in step e) the scaling factor k for the modeled driving force function is set to a ratio between the maximum of the first or second electromotive force or their maximum sum originating from the real electrodynamic acoustic transducer in a period of the first input signal, which includes the first time point found in step d), and the first or second electromotive force or their maximum sum originating from the model of the electrodynamic acoustic transducer in a period of the second input signal, which includes the second time point found in step d).

22. The method as claimed in claim 1, characterized in that the scaling factor k for the modeled driving force function is set to a value, for which a difference between the graph of the first or second electromotive force or of their sum originating from the real electrodynamic acoustic transducer during a time span of at least one time period of the first input signal including said first time point found in step d) and the graph of the first or second electromotive force or of their sum originating from the model of the electrodynamic acoustic transducer during a time span of at least one time period of the second input signal including said second time point found in step d) is below a predetermined threshold based on a least mean square algorithm in step e).

23. The method as claimed in claim 1, characterized in that
the first input signal and the second input signal are sine signals with a varying magnitude in step a);
a frequency of the first input signal and a frequency of the second input signal substantially equals the resonant frequency of the electrodynamic acoustic transducer;
the electromotive force of the first coil of the real electrodynamic acoustic transducer ($U_{emf1}$) and the electromotive force of the second coil of the real electrodynamic acoustic transducer ($U_{emf2}$) are calculated by the formulas $$U_{emf1} = U_{in1} - R_{DC1} \cdot I_{in}$$

$$U_{emf2} = U_{in2} - R_{DC2} * I_{in}$$

in step b) wherein $R_{DC1}$ is a coil resistance of the first coil of the real electrodynamic acoustic transducer, $U_{in1}$ is an input voltage to the first coil of the real electrodynamic acoustic transducer and $I_{in}$ is an input current to the first coil of the real electrodynamic acoustic transducer, and $R_{DC2}$ is a coil resistance of the second coil of the real electrodynamic acoustic transducer, $U_{in2}$ is an input voltage to the second coil of the real electrodynamic acoustic transducer and $I_{in}$ is an input current to the second coil of the real electrodynamic acoustic transducer;
the modeled driving force function is shifted by the shift until a ratio between a root mean square value of the first electromotive force or a rectified low pass filtered first electromotive force and a root mean square value of the second electromotive force or a rectified low pass filtered second electromotive force originating from the real electrodynamic acoustic transducer substantially equals said ratio for the electromotive forces originating from the model of the electrodynamic acoustic transducer in step c);
a graph of a difference of the first electromotive force and the second electromotive force for the real electrodynamic acoustic transducer is calculated and the first time point is selected in the graph of said difference where a gradient of said graph of said difference is substantially zero, and a graph of a difference of the first electromotive force and the second electromotive force for the model of the electrodynamic acoustic transducer is calculated and the second time point is selected in the graph of said difference where a gradient of said graph of said difference is substantially zero in step d); and
the scaling factor k for the modeled driving force function is set to a value, for which a difference between the graph of the first or second electromotive force or of their sum originating from the real electrodynamic acoustic transducer during a time span of at least one time period of the first input signal including said first time point found in step d) and the graph of the first or second electromotive force or of their sum originating from the model of the electrodynamic acoustic transducer during a time span of at least one time period of the second input signal including said second time point found in step d) is below a predetermined threshold based on a least mean square algorithm in step e).

24. The method as claimed in claim 1, characterized in that
the first input signal applied to at least one of the voice coils in step a) is a sine signal with constant magnitude;
the second input signal in step a) is a sine signal with a varying magnitude;
a frequency of the first input signal and a frequency of the second input signal substantially equals the resonant frequency of the electrodynamic acoustic transducer;
the electromotive force of the first coil of the real electrodynamic acoustic transducer ($U_{emf1}$) and the electromotive force of the second coil of the real electrodynamic acoustic transducer ($U_{emf2}$) are calculated by the formulas $$U_{emf1} = U_{in1} - R_{DC1} \cdot I_{in}$$

$$U_{emf2} = U_{in2} - R_{DC2} \cdot I_{in}$$

in step b) wherein $R_{DC1}$ is a coil resistance of the first coil of the real electrodynamic acoustic transducer, $U_{in1}$ is an input voltage to the first coil of the real electrodynamic acoustic transducer and $I_{in}$ is an input current to the first coil of the real electrodynamic acoustic transducer, and $R_{DC2}$ is a coil resistance of the second coil of the real electrodynamic acoustic transducer, $U_{in2}$ is an input voltage to the second coil of the real electrodynamic acoustic transducer and $I_{in}$ is an input current to the second coil of the real electrodynamic acoustic transducer;
the modeled driving force function is shifted by the shift until a ratio between a root mean square value of the first electromotive force or a rectified low pass filtered first electromotive force and a root mean square value of the second electromotive force or a rectified low pass filtered second electromotive force originating from the real electrodynamic acoustic transducer substantially equals said ratio for the electromotive forces originating from the model of the electrodynamic acoustic transducer in step c);
a graph of a difference of the first electromotive force and the second electromotive force for the real electrodynamic acoustic transducer is calculated and the first time point is selected in the graph of said difference where two outer zero crossings of three zero crossings are within a half period (T/2) of the first input signal, and graph of a difference of the first electromotive force and the second electromotive force for the model of the electrodynamic acoustic transducer is calculated and the second time point is selected in the graph of said difference where two outer zero crossings of three zero crossings are within a half period of the second input signal in step d); and the scaling factor k for the modeled driving force function is set to a value, for which a difference between the graph of the first or second electromotive force or of their sum originating from the real electrodynamic acoustic transducer during a time span of at least one time period of the first input signal including said first time point found in step d) and the graph of the first or second electromotive force or of their sum originating from the model of the electrodynamic acoustic transducer during a time span of at least one time period of the second input signal including said second time point found in step d) is below a predetermined threshold based on a least mean square algorithm in step e).

25. The method as claimed in claim 1, characterized in that steps a) to f) are executed in a state, in which the electrodynamic acoustic transducer is built into a target device.

26. An electronic circuit, comprising a model of an electrodynamic acoustic transducer having at least two voice coils and which is connectable to input terminals of the electrodynamic acoustic transducer, the electronic circuit configured to perform the steps of:
 a) applying a first input signal to at least one of the voice coils of the real electrodynamic acoustic transducer and applying a second input signal to the model of the electrodynamic acoustic transducer, which model is based on said modeled driving force function;
 b) calculating a graph of a first electromotive force for a first voice coil of the at least two voice coils and a second electromotive force for a second voice coil of the at least two voice coils of the real electrodynamic acoustic transducer and calculating a graph of a first electromotive force for a first voice coil of the voice coils and a second electromotive force for a second voice coil of the voice coils of the model of the electrodynamic acoustic transducer;
 c) shifting the modeled driving force function by modification of an excursion argument until a deviation between a ratio between the first electromotive force and the second electromotive force of the real electrodynamic acoustic transducer and the ratio between the first electromotive force and the second electromotive force of the model of the electrodynamic acoustic transducer is below a predetermined threshold;
 d) finding/selecting a first time point where the first electromotive force substantially equals the second electromotive force of the real electrodynamic acoustic transducer and find/select a second time point where the first electromotive force substantially equals the second electromotive force of the model of the electrodynamic acoustic transducer with the shifted modeled driving force function;
 e) determining the scaling factor k for the shifted modeled driving force function by use of a deviation of the electromotive forces originating from the real electrodynamic acoustic transducer at said first time point or in a time span including said first time point from the electromotive forces originating from the model of the electrodynamic acoustic transducer at said second time point or in a time span including said second time point; and
 f) updating the modeled driving force function by multiplying the modeled driving force function with the scaling factor k.

27. A transducer system, comprising an electrodynamic acoustic transducer with a membrane, a coil arrangement with at least two voice coils attached to the membrane, a magnet system being designed to generate a magnetic field transverse to a longitudinal direction of a wound wire of the coil arrangement and input terminals for receiving a first input signal, and further comprising an electronic circuit as claimed in claim 26, which is connected to the input terminals of the electrodynamic acoustic transducer.

* * * * *